(12) United States Patent
Li et al.

(10) Patent No.: US 8,441,219 B2
(45) Date of Patent: May 14, 2013

(54) MOTOR CONTROL DEVICE AND ELECTRICAL EQUIPMENT PROVIDED WITH THE SAME

(75) Inventors: Shuting Li, Yokohama (JP); Nobuyuki Suzuki, Yokohama (JP); Toshikazu Sekihara, Kawasaki (JP); Kazunobu Nagai, Yokohama (JP); Yukihisa Hasegawa, Machida (JP); Toshimitsu Aizawa, Kuwana (JP); Sari Maekawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 328 days.

(21) Appl. No.: 12/882,641

(22) Filed: Sep. 15, 2010

(65) Prior Publication Data

US 2011/0062903 A1 Mar. 17, 2011

(30) Foreign Application Priority Data

Sep. 16, 2009 (JP) ................. 2009-214940

(51) Int. Cl.
*H02P 21/00* (2006.01)
*G05B 9/02* (2006.01)
(52) U.S. Cl.
USPC ...... 318/400.02; 315/432; 315/433; 315/434; 315/563; 388/903; 388/907.5
(58) Field of Classification Search ............. 318/400.02, 318/432–434, 563, 600, 602, 605, 661; 388/903, 388/907.5
See application file for complete search history.

(56) References Cited

U.S. PATENT DOCUMENTS

| 7,514,896 B2* | 4/2009 | Imura et al. .................... 318/718 |
| 8,129,931 B2* | 3/2012 | Maekawa et al. ........ 318/400.02 |
| 2002/0117990 A1* | 8/2002 | Sawada et al. ................ 318/727 |
| 2003/0020429 A1* | 1/2003 | Masaki et al. ................ 318/727 |
| 2005/0160771 A1* | 7/2005 | Hosoito et al. ............... 68/12.16 |

(Continued)

FOREIGN PATENT DOCUMENTS

| CN | 1189440 A | 8/1998 |
| CN | 101119090 A | 2/2008 |

(Continued)

OTHER PUBLICATIONS

Office Action issued Aug. 2, 2012 in Chinese Patent Application No. 201010275239.1 with English language translation.

(Continued)

*Primary Examiner* — Thomas Dougherty
(74) *Attorney, Agent, or Firm* — Oblon, Spivak, McClelland, Maier & Neustadt, L.L.P.

(57) ABSTRACT

A motor control device controlling an inverter to control an electric motor, includes a plurality of function sections, a voltage command generating section generating a d-axis voltage command and a q-axis voltage command, a voltage operational processing section, an input current operation section, a speed information generating section estimating a rotational speed of the motor based on at least one of a motor constant, a positional information generating section delivering positional information about a rotor, and a processor executing control software set by a user or a manufacturer. At least a part of the function sections are configured by hardware. The function section configured by the hardware is given at least one parameter retaining section. The parameter retaining section is configured so as to be readable/writable on the processor. The function section is configured by the hardware so as to be operated in a predetermined sequence.

22 Claims, 19 Drawing Sheets

U.S. PATENT DOCUMENTS

| | | | | |
|---|---|---|---|---|
| 2007/0248338 A1* | 10/2007 | Kaneko et al. | | 388/823 |
| 2008/0042614 A1* | 2/2008 | Oomura et al. | | 318/799 |
| 2008/0167779 A1* | 7/2008 | Suzuki | | 701/42 |
| 2008/0224645 A1* | 9/2008 | Ide | | 318/608 |
| 2008/0290826 A1* | 11/2008 | Nagase et al. | | 318/400.02 |
| 2009/0026999 A1* | 1/2009 | Atarashi | | 318/720 |
| 2010/0090640 A1* | 4/2010 | Maekawa et al. | | 318/701 |
| 2010/0308757 A1* | 12/2010 | Ide et al. | | 318/400.02 |

FOREIGN PATENT DOCUMENTS

| | | |
|---|---|---|
| CN | 101499753 A | 8/2009 |
| JP | 05-300785 A | 11/1993 |
| JP | 07-075361 A | 3/1995 |
| JP | 2004-254480 A | 9/2004 |
| JP | 2005-168282 | 6/2005 |
| JP | 2006-067747 A | 3/2006 |
| JP | 2006-230200 A | 8/2006 |
| JP | 2007-244114 A | 9/2007 |
| JP | 2008-011628 A | 1/2008 |
| JP | 2009-022085 A | 1/2009 |
| JP | 2009-118663 A | 5/2009 |

OTHER PUBLICATIONS

Office Action issued Sep. 11, 2012 in Japanese Patent Application No. 2010-208533 with English language translation.

* cited by examiner

| FIG. 1A | FIG. 1B |

CONTROL OPERATION COMMAND AND OPERATION PROCESSING (EXAMPLE)

| | CONTROL OPERATION COMMAND | CURRENT CONTROL | SIN/COS OPERATION | dq/αβ CONVERSION | αβ/UVW CONVERSION | PWM FORMING |
|---|---|---|---|---|---|---|
| 0 | INDIVIDUAL OPERATION | ※1 | ※1 | ※1 | ※1 | ※1 |
| 1 | COMMAND 1 | ○ | ○※2 | ○ | ○ | ○※3 |
| 2 | COMMAND 2 | — | ○※2 | ○ | ○ | ○※3 |
| 3 | COMMAND 3 | — | — | — | — | ○※3 |

| TRIGGER GENERATION | A/D CONVERSION | UVW/αβ CONVERSION | αβ/dq CONVERSION |
|---|---|---|---|
| ※1 | ※1 | ※1 | ※1 |
| ○ | ○ | ○ | ○ |
| ○ | ○ | ○ | ○ |
| ○ | ○ | — | — |

※1 ONLY DESIGNATED OPERATION PROCESS IS EXECUTED
※2 PHASE INTERPOLATION IS SETTABLE
※3 OUTPUT-OFF IS SETTABLE

FIG. 4

EXAMPLE OF SETTING BY TYPICAL OPERATION FLOW

| MOTOR CONTROL FLOW | SETTING | | | |
|---|---|---|---|---|
| | CONTROL OPERATION COMMAND | OUTPUT CONTROL OPERATION | ZERO CURRENT | ALLOWING PHASE INTERPOLATION |
| HALT | 3 | × | × | × |
| ZERO CURRENT DETECTION | 3 | × | ○ | × |
| POSITIONING | 1 | ○ | × | × |
| FORCED COMMUTATION | 1 | ○ | × | ○ |
| SWITCHING FROM FORED COMMUTATION TO STEADY STATE | 1 | ○ | × | × |
| STEADY STATE | 1 | ○ | × | × |

FIG. 5

| | OPERATION | OPERATIONAL FUNCTION | OPERATION NUMBER |
|---|---|---|---|
| OUTPUT PROCESS | CURRENT CONTROL | dq CURRENT CONTROL | 5 |
| | SIN/COS OPERATION | SIN/COS OPERATION, PHASE INTERPOLATION | 6 |
| | dq/αβ CONVERSION | CONVERSION FROM dq COORIDNATE AXIS TO αβ COORDINATE AXIS | 7 |
| | αβ/UVW CONVERSION | CONVERSION FROM TWO-PHASE TO THREE-PHASE | 8 |
| | PWM FORMING | DATA CONVERSION TO MD SETTING MODE | 0 |
| | TRIGGER GENERATION | GENERATION OF TRIGGR TIMING | 1 |
| INPUT PROCESS | A/D CONVERSION | FETCHING A/D CONVERSION RESULT | 2 |
| | UVW/αβ CONVERSION | CONVERSION FROM THREE-PHASE TO TWO-PHASE | 3 |
| | αβ/dq CONVERSION | CONVERSION FROM αβ COORDINATE AXIS TO dq COORDINATED AXIS | 4 |

FIG. 6

| FIG.10 |
|---|
| FIG.10A |
| FIG.10B |

| VOLTAGE VECTOR | SWITCH-ON PATTERN | DC CURRENT | VOLTAGE VECTOR | SWITCH-ON PATTERN | DC CURRENT |
|---|---|---|---|---|---|
| (100) | | +Iu | (011) | | −Iu |
| (010) | | +Iv | (101) | | −Iv |
| (001) | | +Iw | (110) | | −Iw |
| (111) | | 0 | (000) | | 0 |

FIG. 12

MOTOR CONTROL DEVICE AND ELECTRICAL EQUIPMENT PROVIDED WITH THE SAME

CROSS-REFERENCE TO RELATED APPLICATIONS

This application is based on and claims the benefit of priority from the prior Japanese Patent Application No. 2009-214940, filed on Sep. 16, 2009, the entire contents of which are incorporated herein by reference.

FIELD

Embodiments described herein relate to a motor control device for controlling an electric motor and electrical equipment provided with the motor control device.

BACKGROUND ART

Microprocessors or digital signal processors (DSPs) have conventionally been used to control electric motors. When software is coded using a microprocessor or a DSP, software designers need to be technologically sophisticated since various function blocks for vector control need to be converted into software. Accordingly, a development period and achievement of specification requirement depend upon designer's skill, software programming and/or an experience point of coding.

Techniques of configuring an entire motor control sequence into hardware have been developed in order to overcome the above-described problem. For example, a plurality of operation control modules is configured by digital hardware by means of z transformation. An electric motor is controlled by a sequencer which executes these operation control modules and the like in a predetermined sequence. In this case, no software needs to be developed, and the number of parameters to be set is reduced. Accordingly, the motor can be controlled easily. Moreover, the motor control is executed at higher speeds than by a software configuration. However, since the modules executing the control operation are configured into hardware by the above-described technique, particular functions desired by a user using a motor control device cannot be added. Thus, the above-described technique is difficult to apply to products which necessitate the peculiar processes.

BRIEF DESCRIPTION OF THE DRAWINGS

FIG. 4 is a table showing control operation commands and operation processing examples;

FIG. 5 is a table showing examples of set control operation commands;

FIG. 6 shows input and output processes and sequences of the processes;

FIG. 12 shows a control correspondence among the voltage vector, energization pattern and direct current;

DETAILED DESCRIPTION

In general, according to one embodiment, a motor control device is disclosed. The device which controls an inverter thereby to control an electric motor includes a plurality of function sections including a voltage command generating section which generates a d-axis voltage command and a q-axis voltage command; a voltage operation processing section which delivers an energization signal to the inverter including a switching element and driving the motor, based on the d-axis voltage command and the q-axis voltage command both generated by the voltage command generating section; a current detecting section which detects current flowing in a winding of the motor when the voltage operation processing section has delivered the energization signal to the inverter; an input current operation section which obtains the d-axis current that is an excitation component current and the q-axis current that is a torque component current, based on the current detected by the current detecting section; a speed information generating section which estimates or detects a rotational speed of the motor based on at least one of a motor constant, the d-axis voltage generated by the voltage command generating section, the q-axis voltage generated by the voltage command generating section, the d-axis current obtained by the input current operation section, the q-axis current obtained by the input current operation section, thereby delivering a rotational speed signal; and a positional information generating section which delivers positional information about a rotor of the motor, based on the rotational speed signal delivered by the speed information generating section. The device further includes a processor which executes control software provided by a user or a manufacturer. At least a part of the function sections are configured by hardware. The function section configured by the hardware is provided with at least one parameter retaining section including input registers, output registers, inner variable registers, inner constant registers. The parameter retaining section is configured so as to be readable/writable on the processor. The function section is configured by the hardware so as to be operated in a predetermined sequence. Each function section is realized by executing the control software by the processor, and the function realized by executing the control software by the processor is configured so as to be switchable to the function section configured in the hardware. The above-mentioned motor constant designates a resistance value of the motor, an inductance value and an induced voltage coefficient.

Figures 1, 1A:
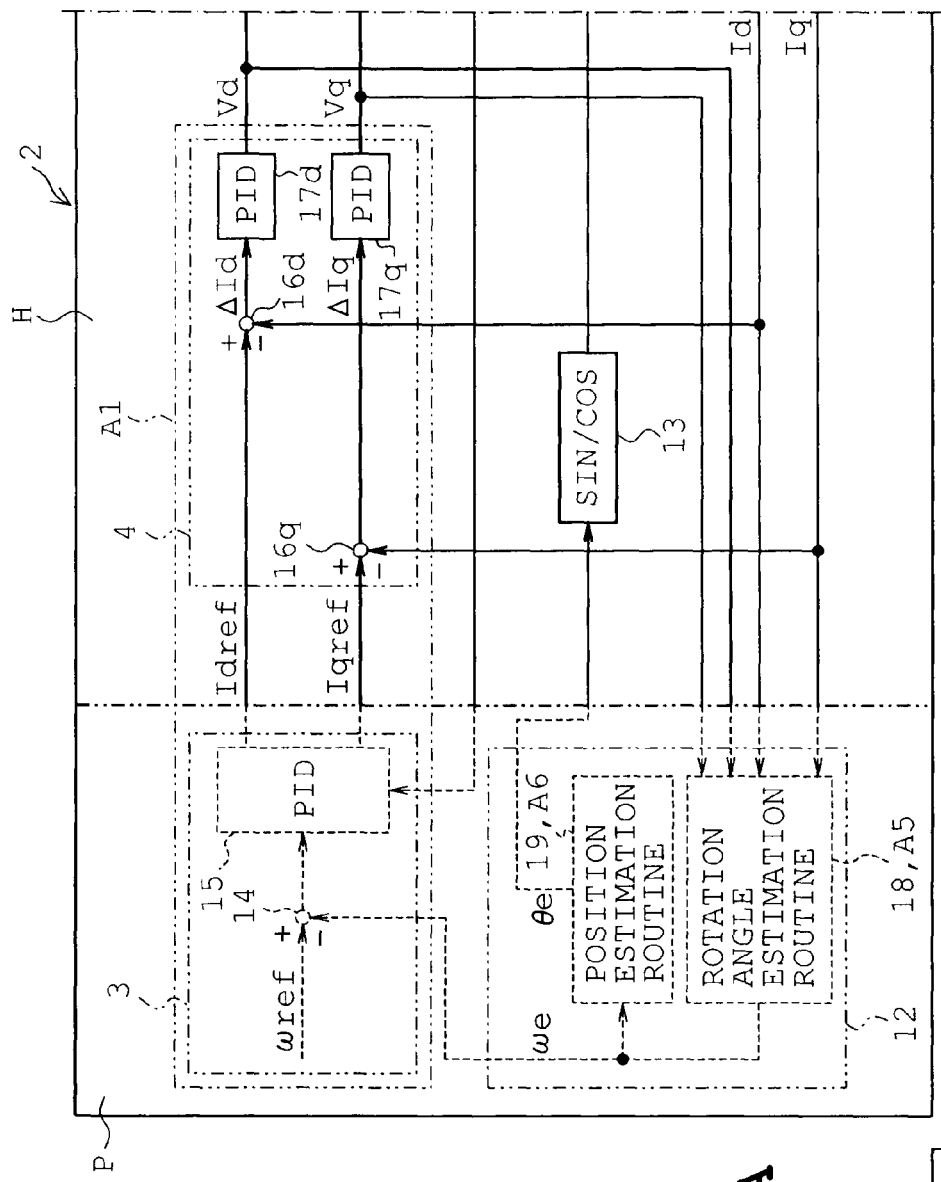
FIGS. 1A and 1B are functional block diagrams showing a motor control device in accordance with a first embodiment.
Figure 1B:
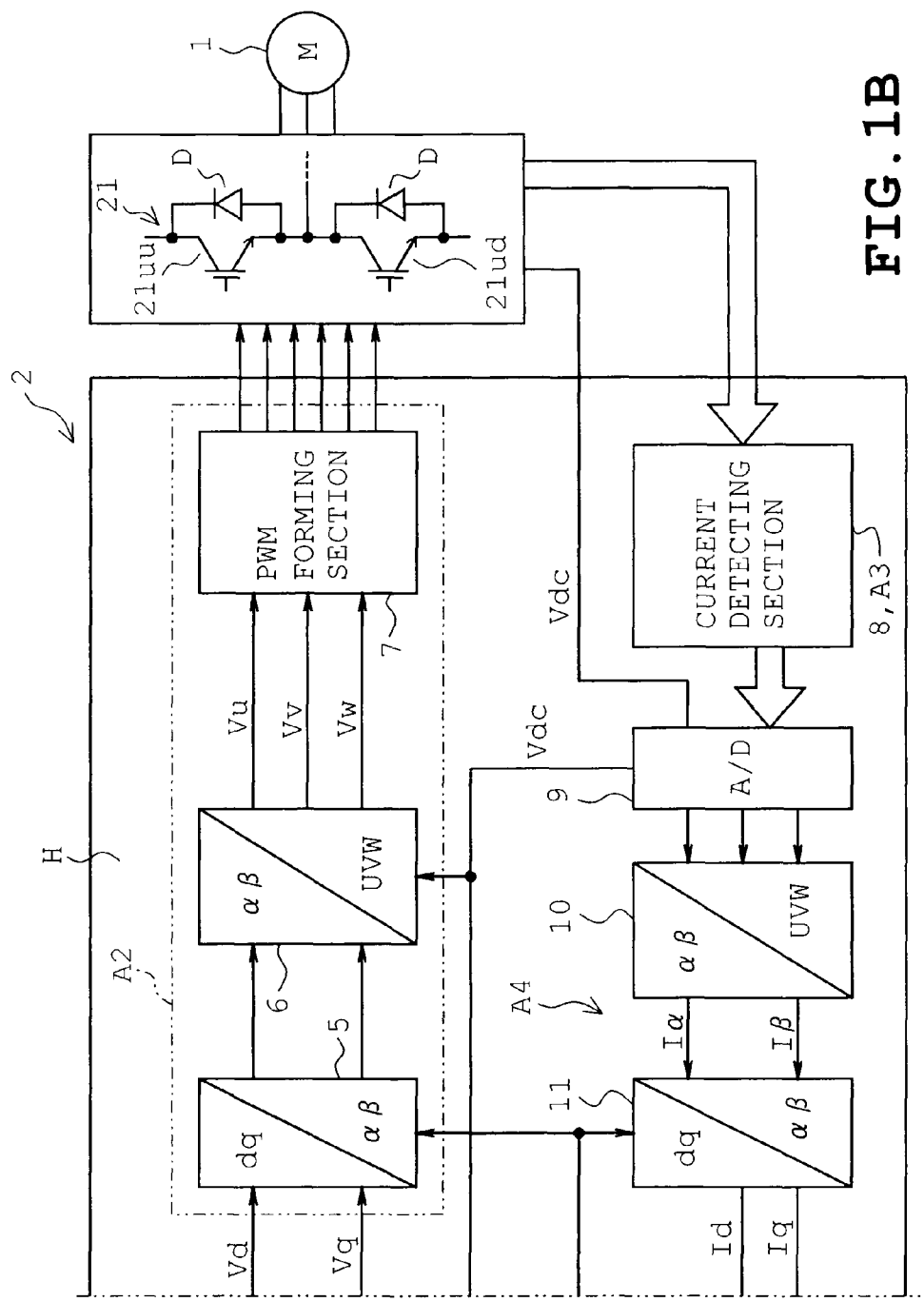

A first embodiment will be described with reference to FIGS. 1A to 8B. FIGS. 1A and 1B show a motor control system which executes a vector control for rotation of an electric motor. An electric motor 1 comprises a three-phase interior permanent magnet (IPM) motor, for example. In the vector control technique, current flowing into an armature winding is split into current flowing in the direction of magnetic flux of permanent magnet and current flowing in a direction perpendicular to the direction of magnetic flux. The split currents are adjusted independently. Magnetic flux and torque generated are controlled with respect to each current. In a current control technique, the current control is executed using a d-axis current (excitation current) and a q-axis current (torque component current) plotted as a d-q coordinate system rotated with a rotor of the motor 1.

A motor control device 2 functionally includes a speed control section 3, a current control section 4, a dq/αβ coordinate converter 5, an αβ/UVW coordinate converter 6, a PWM signal generating section 7, a current detector 8, an A/D converter 9, a UVW/αβ coordinate converter 10, an αβ/dq coordinate converter 11, a position estimating section 12 and a SIN/COS operation section 13, as shown in FIGS. 1A and 1B. In a steady state, a sequence control operation is executed in the order of the above-mentioned reference numerals.

Component sections realized by control software executed by a processor P are shown by dotted line in the figures, whereas component sections realized by hardware H are shown by solid line in the figures. The speed control section 3 includes a subtractor 14 and a proportional-integral-derivative (PID) controller 15 which is connected to the subtractor 14 and executes a PID control based on results of subtraction by the subtractor 14, thereby delivering a d-axis current command $I_{dref}$ and a q-axis current command $I_{qref}$.

The current control section 4 includes subtractors 16d and 16q and PID controllers 17d and 17q. The speed control section 3 supplies a d-axis current command $I_{dref}$ to the subtractor 16d. The subtractor 16d then subtracts a d-axis current $I_d$ from the d-axis current command $I_{dref}$, thereby obtaining a d-axis current deviation $\Delta I_d$. The speed control section 3 supplies a q-axis current command $I_{qref}$ to the subtractor 16q. The subtractor 16q then subtracts a q-axis current $I_q$ from the q-axis current command $I_{qref}$, thereby obtaining a q-axis current deviation $\Delta I_q$. The PID control section 17d executes a PID operation for the d-axis current deviation $\Delta I_d$ thereby to generate a d-axis voltage command $V_d$ represented by the d-q coordinate system. Furthermore, the PID control section 17q executes a PID operation for the q-axis current deviation $\Delta I_q$ thereby to generate a q-axis voltage command $V_q$ represented by the d-q coordinate system.

The dq/αβ coordinate converter 5 converts the d-axis voltage command $V_d$ and the q-axis voltage command $V_q$ to respective values represented by an α-β coordinate system. Furthermore, the αβ/UVW coordinate converter 6 converts the values represented by the α-β coordinate system to three-phase voltage commands $V_u$, $V_v$ and $V_w$ of the stator. An estimated rotation angle $\theta_e$ of the rotor is used in the calculation of coordinate conversion in the dq/αβ coordinate converter 5.

DC power supply voltage $V_{dc}$ is also supplied to the αβ/UVW coordinate converter 6. The three-phase voltage commands $V_u$, $V_v$ and $V_w$ are adapted to be delivered also in consideration of the power supply voltage $V_{dc}$. The phase voltage commands $V_u$, $V_v$ and $V_w$ are delivered to the PWM signal forming section 7. The PWM signal forming section 7 forms pulse-width modulated gate drive signals for supplying voltages corresponding with the d-axis voltage command $V_d$ and the q-axis voltage command $V_q$.

Figure 2:
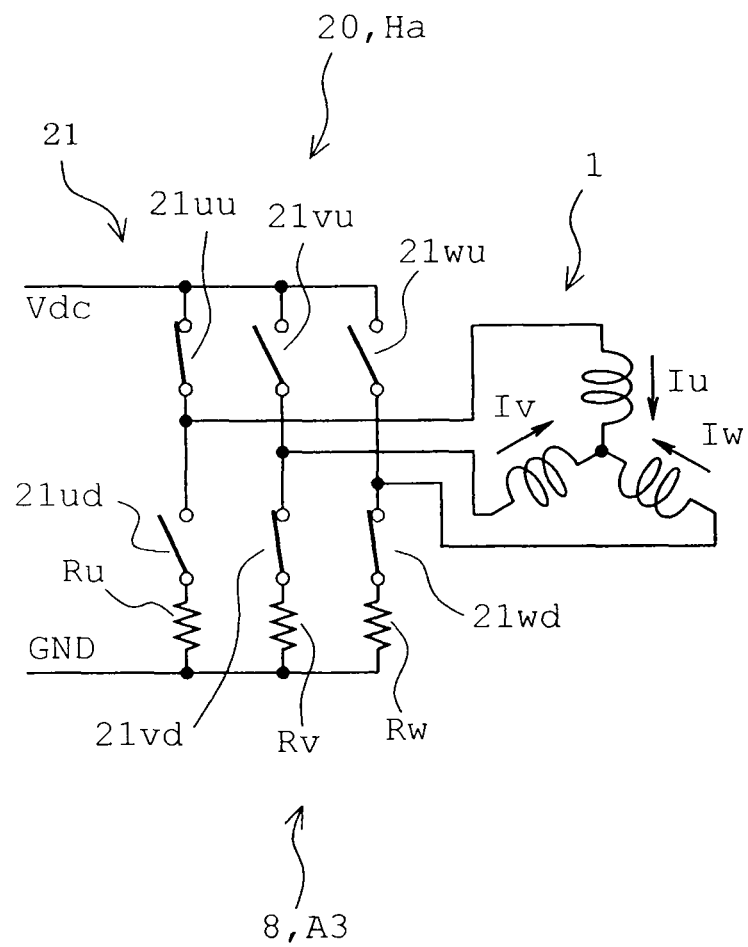
FIG. 2 is a diagram showing an electrical arrangement of the current detection section of 3 shunt detection system.

The motor control device 2 applies the aforesaid gate drive signals to an inverter circuit 20 thereby to control the motor 1. FIG. 2 schematically shows an electrical arrangement of the current detecting section. The inverter circuit 20 is configured into a voltage inverter including insulated gate bipolar transistors (IGBTs) 21 (21uu, 21ud, 21vu, 21vd, 21wu and 21wd; switching elements) which are configured as hardware Ha of a three-phase bridge circuit. Shunt resistances Ru, Rv and Rw are connected between lower arm side IGBTs 21ud, 21vd and 21wd and a negative side DC power supply line respectively. Reflux diodes D are connected to the IGBTs in an inverse-parallel connection.

In the embodiment, currents $I_u$, $I_v$ and $I_w$ flowing into the phases of the motor 1 are adapted to be detected according to terminal voltages of the shunt resistances $R_u$, $R_v$ and $R_w$, respectively, whereby a 3 shunt current detector 8 (symbol A3) is configured.

Gate drive signals formed by the PWM signal forming section 7 are supplied to gates of the IGBT 21 composing the inverter circuit 20, whereupon PWM-modulated three-phase AC voltages corresponding with the phase voltage commands $V_u$, $V_v$ and $V_w$ are applied to the armature windings of the motor 1 respectively.

The currents $I_u$, $I_v$ and $I_w$ are detected by the current detecting section 8. The A/D conversion section 9 executes an A/D conversion of the currents $I_u$, $I_v$ and $I_w$. The UVW/αβ coordinate conversion section 10 converts the A/D converted currents $I_u$, $I_v$ and $I_w$ into two-phase currents $I_\alpha$ and $I_\beta$. The αβ/dq coordinate converter 11 converts the two-phase currents $I_\alpha$ and $I_\beta$ into a d-axis current $I_d$ and a q-axis current $I_q$. Symbols α and β designate coordinate axes of the biaxial coordinate system assumed to be fixed to the stator of the motor 1. When the computation of the coordinate conversion of the αβ/dq coordinate converter 11 is executed, an estimated rotation angle $\theta_e$ of the rotor (an estimated value of phase difference between α axis and β axis) is used as will be described later.

The position estimating section 12 has a rotation angle estimation routine 18 and a position estimation routine 19. D-axis current $I_d$, q-axis current $I_q$ and d-axis voltage command $V_d$ are supplied to the position estimating section 12. Using these input values, the position estimating section 12 estimates an estimated rotation angle $\theta_e$ that is an estimated value of a rotation angle $\theta$ (rotational position) and an estimated rotational speed $\omega_e$ that is an estimated value of rotational speed $\omega$. The position estimating section 12 stores values of a d-axis inductance $L_d$ and a q-axis inductance $L_q$ of the armature winding and winding resistance values all of which are circuit constants of the motor 1.

In the rotation angle estimating routine 18 of the position estimating section 12, the processor P computes an estimated induced voltage value $E_d$ of the d-axis direction using the aforementioned input values, circuit constants and software based on the following equation (1):

$$E_d = V_d - R \cdot I_d - L_d \cdot s \cdot I_d + \omega_e \cdot L_q \cdot I_q \qquad (1)$$

where s is a differential operator. In the routine 18, the processor P executes a PID operation according to the estimated induced voltage value $E_d$, thereby delivering an estimated rotational speed $\omega_e$ of the rotor (corresponding to rotational speed signal). When this estimation method is applied to the embodiment, the induced voltage value Ed in the d-axis direction converges to zero. The position estimation routine 19 is configured by software of an integration routine executed by the processor P and integrates an obtained estimated rotational speed $\omega_e$, thereby delivering an estimated rotation angle $\theta_e$ (corresponding to position information of the rotor).

The estimated rotational speed $\omega_e$ is supplied to the speed control section 3. The processor P delivers the estimated rotation angle $\theta_e$ to a SIN/COS operation section 13. The SIN/COS operation section 13 carries out an operation of trigonometric function corresponding to the estimated rotation angle $\theta_e$ or refers to a trigonometric table, thereby applying an obtained trigonometric value to the dq/αβ coordinate converter 5 and the αβ/dq coordinate converter 11 for the feedback control.

A rotational speed command $\omega_{ref}$ delivered from an external control device (not shown) is supplied to the speed control section 3. The subtractor 14 subtracts the rotational speed $\omega_e$ estimated by the position estimating section 12 from the rotational speed command $\omega_{ref}$ thereby to obtain a speed deviation $\Delta_\omega$. The subtractor 14 supplies the obtained speed deviation $\Delta\omega$ to the PID controller 15. The PID controller 15 executes a PID operation based on the speed deviation $\Delta\omega$ thereby to generate a q-axis current command $I_{qref}$. The aforementioned d-axis current command $I_{dref}$ and the q-axis current command $I_{qref}$ are supplied to the current control section 4. The current control section 4 controls the d-axis current $I_d$ and the q-axis current $I_q$ of the motor 1 so that the d-axis current $I_d$ and the q-axis current $I_q$ correspond with the d-axis current command $I_{dref}$ and the q-axis current command $I_{qref}$ respectively. The estimated rotational speed $\omega_e$ corresponds with the rotational speed command $\omega_{ref}$ as the result of the above-described control.

In the foregoing configuration, the feedback control is carried out by the PID operation executed by the subtractors 16*d* and 16*q* and the PID controllers 17*d* and 17*q*. Consequently, the d-axis current $I_d$ and the q-axis current $I_q$ are controlled so as to correspond with the d-axis current command $I_{dref}$ and the q-axis current command $I_{qref}$ respectively.

The speed control section 3 and the position detecting section 12 are operated by the processor P executing the control software. The current control section 4, the dq/αβ coordinate converter 5, the αβ/UVW coordinate converter 6, the PWM forming section 7, the current detector 8, the A/D converter 9, the UVW/αβ coordinate converter 10, the αβ/dq coordinate converter 11 and the SIN/COS operation section 13 are configured by the hardware H. Furthermore, the inverter circuit 20 (inverter) is configured by hardware Ha other than the motor control device 2.

The hardware H is designed by description of a hardware description language or the like using a programmable logic device (PLD) or a field programmable gate array (FPGA) in each of which a logic circuit is changeable or modifiable. In the mass-production, the hardware H is configured into a semiconductor device in which a control algorithm is unmodifiable by the use of software. Furthermore, the hardware H is configured to be operable independently when needed, other than the setting of a parameter and a trigger (start instruction, stop instruction) executed by the processor P.

The manufacturer of the motor control device 2 provides blocks by which a user can easily exhibit his/her originality or function sections which are apt to accompany future design change. These blocks or function sections can be configured by software realizable by the processor P. In particular, it is desirable to configure, by hardware, a function section in which the vector control is executed with input-to-output in a one-to-one or many-to-many relation and which cannot consider user's know-how.

Components 4 to 11 and 13 constituting the function sections A1 to A4 of the hardware H are provided with respective registers which are accessible (readable/writable) from the processor P although the registers are not shown. The registers can hold input/output parameters between the processor P and the hardware H and internal constants and internal variables internally used by the components 4 to 11 and 13 respectively.

The speed control section 3 and the current control section 4 constitute a voltage command generating section A1. The dq/αβ coordinate converter 5, the αβ/UVW coordinate converter 6 and the PWM forming section 7 constitute a voltage operation processing section A2. The UVW/αβ coordinate converter 10 and the αβ/dq coordinate converter 11 constitute an input current operating section A4. The rotation angle estimating routine 18 constitutes a speed information generating section A5. The position estimating section 19 constitutes a position information generating section A6. The blocks A1 to A6 correspond to function sections respectively. Although the current detecting section 8 is configured as a current detecting section A3 in the embodiment, the A/D converter 9 may be formed as the current detecting section A3 or the input current operating section A4.

A flow of control from a halting state to steady rotation of the motor will be described as an example of use of the motor control device according to the embodiment with reference to FIGS. 3 to 8B. The user of the motor control device 2 can drive the motor 1 in the steady rotation when using the above-described control manner. Since the control software is modifiable while using the hardware H, the motor control device 2 can be applied to a wide variety of applications.

Figure 3:
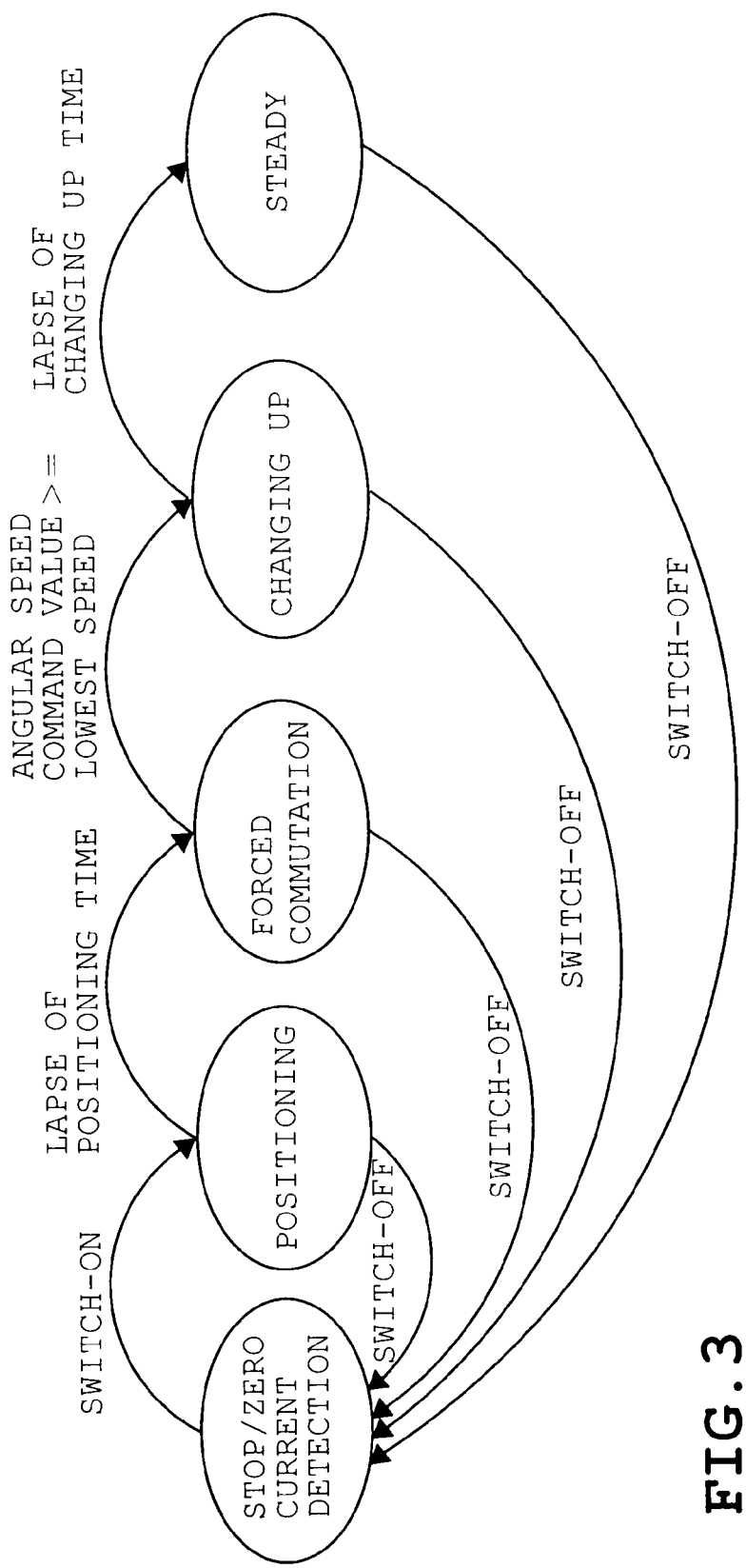
FIG. 3 is a state transition diagram of motor control stages.

FIG. 3 shows transition of the motor from the halting state to the steady rotation, that is, an application of the motor control device 2. In order that the motor 1 may initially be operated, the operation of the motor 1 needs to be monitored and a necessary processing may be carried out according to the state of the motor 1. For this purpose, the motor 1 is controlled while the initial operation of the motor 1 is divided into a plurality of stages. The reason for this control manner is that a necessary processing differs in every control stage. In the state as shown in FIG. 3, the initial operation of the motor 1 is divided into a halt/zero current detection stage, a positioning stage, a forced commutation stage, a forced steady switching state and a steady stage. Only processing by the software and hardware corresponding to each stage is executed in each stage.

The motor 1 stops at the halt/zero current detection stage. At this stage, a result of A/D conversion at the time of zero current is continuously obtained during the halting state of the motor 1, and the obtained result serves as an offset value of the current of the motor 1 (detection of zero current). At the next positioning stage, current is caused to flow into coils of the motor 1 so that the position of the rotor is fixed near zero. The control sequence transfers to the next stage upon elapse of the positioning time.

The rotor is rotated at the forced commutation stage. The feedback control by the vector control is not executed at this stage but a rotating field is forcedly applied to the motor 1, whereby the rotor is rotated, following the rotational field. The control sequence advances to a next stage when an angular speed command has reached a minimum frequency.

At the forced switching stage, the motor 1 is switched from the forced commutation state to a steady state. The motor 1 driven irrespective of the position of the rotor is driven in response to the position of the rotor. The control sequence advances to a next steady stage upon lapse of the forced switching time.

FIG. 4 is a table showing control operation commands and operation processing examples. As shown, the control operation command is divided into a plurality of commands, and a control operation by the processor P and a control operation of the hardware H are switchable between "valid" and "invalid." In FIG. 4, a trigger generating section is a function section which generates a trigger used to control input/output process and is realized by software or the hardware H.

A control operation command "0" instructs a mode in which the sequential processing of each function section is disabled and the function sections are operable independently. A control operation command "1" instructs a mode in which control operations of all function sections are enabled and a sequential processing of each function section is enabled.

A control operation command "2" instructs a mode in which only the control operation of the current control section 4 is disabled and a sequential processing of each of the other function sections is enabled. A control operation command "3" instructs a mode in which only the control operations of the PWM signal forming section 7 and A/D converter 9 (the current detector 8) are enabled.

FIG. 5 is a table showing examples of set control operation commands. As shown, the control operation command "3" is used in a halting/zero current detection state (halting/zero current detecting stage), and the control operation command "1" is used in each of the subsequent positioning state (positioning stage), the forced commutation state (forced commutation stage), the forced switching state (forced switching stage) and the steady state (steady state). FIG. 5 also shows examples of validity/invalidity of an output control operation (feedback control operation), validity/invalidity of a zero current detecting operation and allowance/disallowance of phase interpolation.

In the halt/zero current detection state, the output control operation (feedback control operation) is disabled such that the PWM control operation halts. Furthermore, the zero current detection is set so as to be enabled only in the zero current detection state, and the phase interpolation is set so as to be allowed only in the forced commutation state. These control operation setting tables as shown in FIGS. 4 and 5 are stored on a memory to which the control software refers. The processor P refers to the control operation setting tables while monitoring the operating state of the motor 1 from the control software, whereby the operation of the motor 1 can be controlled.

FIG. 6 shows input and output processes and sequences of the processes. As shown, operations to be executed are allotted to the input and output processes. The output process includes a current control process, a SIN/COS operation process, an output coordinate axis conversion process, an output phase conversion process, an output control process and a trigger generation process. The input process includes an A/D conversion process, an input phase conversion process and an input coordinate axis conversion process. These operations are executed in a predetermined sequence except for one or more operations set to be disabled by a control operation command.

<Trigger Interrupt Process>

A trigger interrupt process will briefly be described. Each process starts with an operation which is set so as to be enabled by a control operation command. When all the operations of the output process have been completed, the processor P is on standby for a start-up trigger for execution of the input process. Upon generation of start-up trigger of the input process, the operations of the input process are sequentially executed from the A/D conversion process. The input process is initiated in response to the start-up trigger. Thereafter, the output process is executed in response to a control operation command. The control operations are thus repeated.

Figure 7:
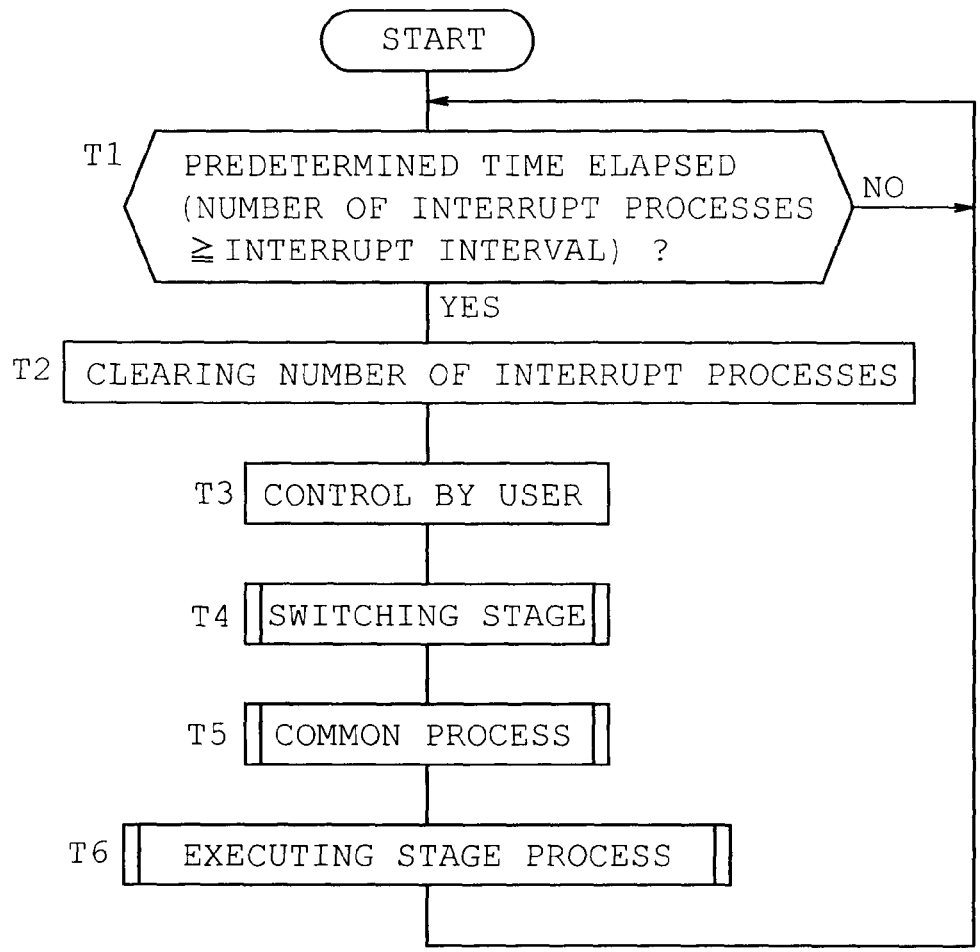
FIG. 7 is a flowchart showing a main process of the control software.
Figure 8A:
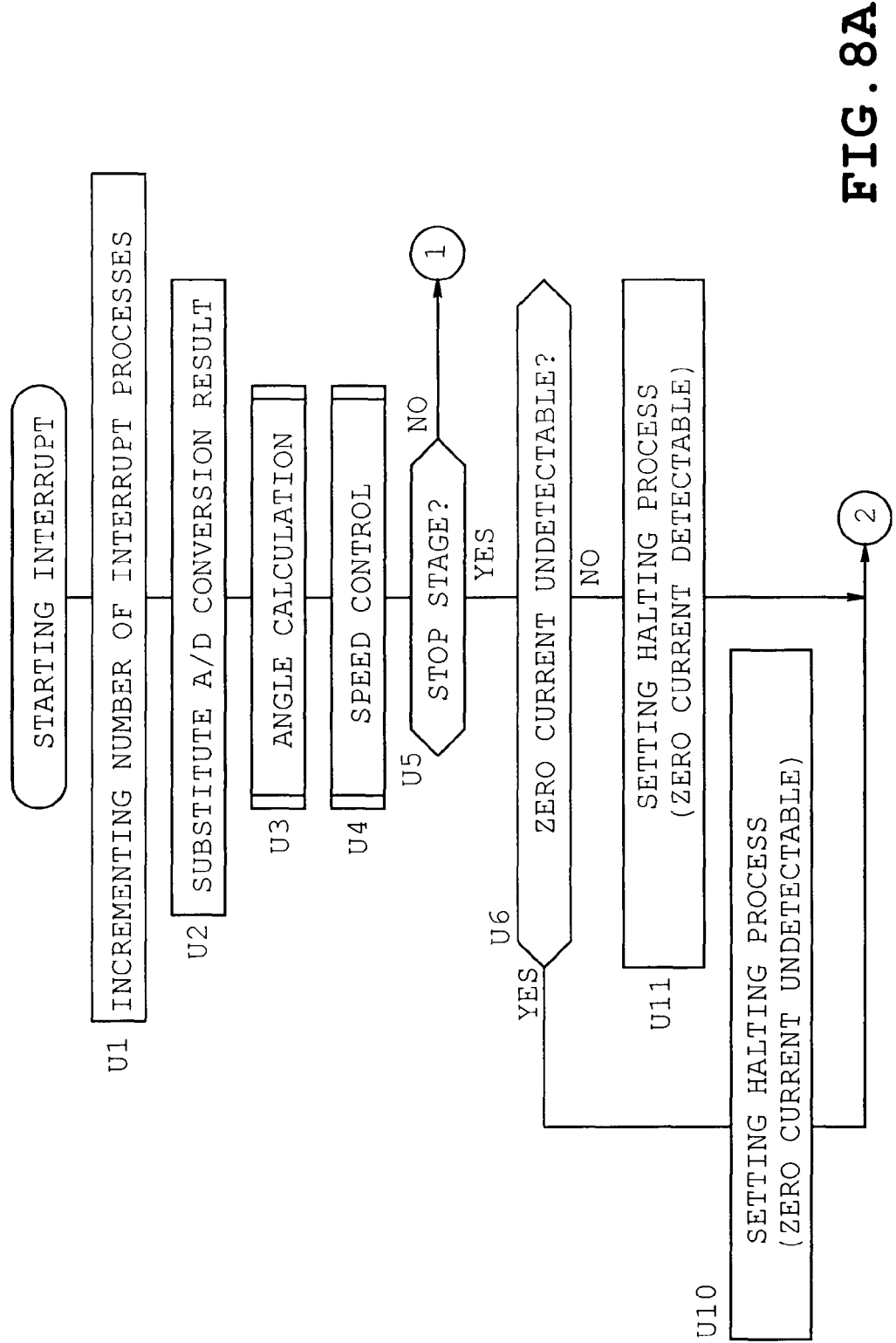
FIGS. 8A and 8B are flowcharts showing an interrupt process of the control software.
Figure 8B:
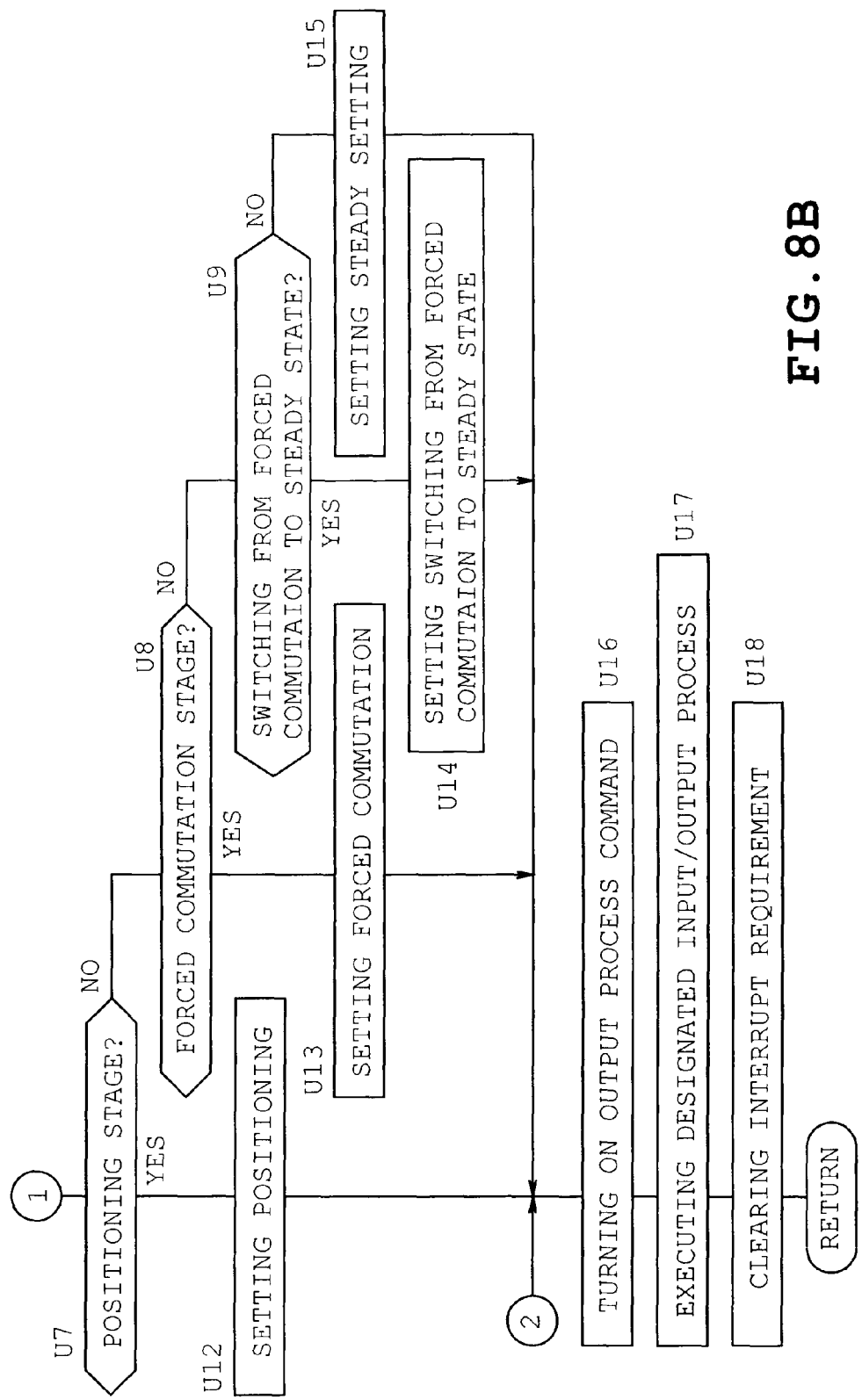

FIGS. 7, 8A and 8B schematically illustrate processes mainly carried out by the processor P on the control software.

<Main Process>

In a main routine shown in FIG. 7, the processor P repeats control at intervals of a predetermined time (T1 to T6). The predetermined time is set on the basis of an interrupt processing time (number of interrupt processes×interrupt interval). The processor P executes an operation on control software configured by the user (T3), the switching of stages (T4), common process (T5) and stage process (T6) at the intervals of the predetermined time. The stage process is any one of the halt/zero current detection process, the positioning process, the forced commutation switching process, and the steady process.

<Interrupt Process>

An interrupt process as shown in FIG. 8 is executed at the intervals of a period of PWM signal in the embodiment. In the interrupt process, the number of interrupt process is incremented (U1) and latest result of A/D conversion is substituted into the register (U2). Next, the processor P executes the control software such as an angle calculation process (U3) and a speed control process (U4).

In each stage process, it is determined whether each stage process is to be executed (U5 to U9). A control operation command according to each stage process is set as a command (U10 to U15). After having set the control operation command as the command, the processor P turns on the output process command (U16), providing the hardware H with an operation start command. The hardware H then executes the designated input/output process (U17). An interrupt requirement is cleared after execution of the input/output process by the hardware H (U18).

The following shows applications of setting parameters on the hardware H.

<Application 1: Short-Circuit Brake Control and Generative Brake Control>

Both of the d-axis voltage command $V_d$ and the q-axis voltage command $V_q$ need to be zero in order that a short-circuit brake may be realized. In this case, operations of the speed control section 3 by the software and the current control section 4 by the hardware H are disabled on the processor P. Set parameter values of the d-axis voltage command $V_d$ and the q-axis voltage command $V_q$ are directly set to zero on the voltage value input registers respectively. Then the hardware H directly controls the inverter circuit 20, whereby the short-circuit brake can be realized. In the same manner, the processor P adjusts set values of parameters of the d-axis and q-axis voltage commands $V_d$ and $V_q$, whereby a generative brake can be realized.

<Application 2: Free-Run>

Both of the d-axis and q-axis current commands $I_{dref}$ and $I_{qref}$ need to be zeroed in order that inertial rotation of the motor may be realized. In this case, the operation of the speed control section 3 by the software from the processor P is disabled, and set parameter values of the d-axis current command $I_{dref}$ and the q-axis current command $I_{qref}$ are directly set to zero on the current value input registers respectively. Then the hardware H directly controls the inverter circuit 20, whereby the free-run of the motor 1 can be realized via the inverter circuit 20 from the hardware H.

As shown in applications 1 and 2, the processor P can write the d-axis and q-axis current commands $I_{dref}$ and $I_{qref}$ as the d-axis and q-axis current value commands on the current value input registers respectively. The processor P can also write the d-axis and q-axis voltages $V_d$ and $V_q$ as the d-axis and q-axis voltage value commands on the voltage value input registers respectively. Accordingly, various functions, for example, the short-circuit brake, the generative brake, the inertial rotation or the like, can be realized.

As described above, the hardware H constitutes the current control section 4, the dq/αβ coordinate converter 5, the αβ/UVW coordinate converter 6, the PWM forming section 7, the current detecting section 8, the A/D converter 9, the UVW/αβ coordinate converter 10, the αβ/dq coordinate converter 11 and the SIN/COS operation section 13. Since the hardware H is constituted as a fixed processing portion common to users, the processing can be sped up. Moreover, since the position estimation section 12 and the speed control section 3 are configured by soft ware, the user can easily modify the motor control device 2, and the freedom in the control manner by the user can be improved. The user can control the motor 1 by configuring the control software in such a manner that the operation of the hardware H is compensated for. As a result, the motor control device (electrical equipment) applied in various forms can be configured.

Since the operations of parts of the hardware H are switchable between "enable" and "disable" from the processor P, the user can easily configure the control software in various manners. Furthermore, the processor P can select a plurality of control operations by writing a command value according to the control onto the registers of the hardware H. Consequently, the processor P can easily instruct the control operation.

It has conventionally been difficult to perform a correct and precise control unless all of the predetermined processes are executed at a predetermined frequency (8 or 16 kHz, for example) for a predetermined time in second (64 microseconds, for example). In the technical field of motor drive control, most of the time (about 40 microseconds, for example) is consumed for only the basic control processing. Moreover, noise offensive to the ear easily tends to be produced when the switching frequency is low. Accordingly, increasing the aforesaid predetermined frequency into a high frequency has been desired.

Addition of an application in a short period of time left has a definite limit when the above-described processing of the hardware H is implemented only by the control software without execution of the processing of the hardware H and the user adds the application specific to the product thereby to provide a control device as a product, for example. Furthermore, when the aforesaid predetermined frequency is reduced in order that such a failure as described above may be avoided, the frequency reduction becomes a factor that produces offensive noise.

However, since the motor control device is configured by the hardware H as well as the processor P in the embodiment, the processing time can be shortened to a large extent, and the user can provide the motor control device added with desired applications. As a result, a control resolution of the motor 1 can be improved to a large degree, and the control of the motor 1 can be rendered easier without production of offensive noise.

According to the foregoing embodiment, a part of the function sections A1 to A6 of the motor control device 2 are constituted by the hardware H, whereas the other part is constituted by the software executed by the processor P. Accordingly, when the processor P sets the parameters on the hardware H, both hardware H and software executed by the processor P can simultaneously be operated. More specifically, in case where all the function sections are constituted by the software executed by the processor P or the hardware H, a sequential processing is carried out thereby to prolong the processing time. In the embodiment, however, a part of the function sections A1 to A6 of the motor control device 2 are constituted by the hardware H, whereas the other part is constituted by the software executed by the processor P. Consequently, the operational processing for the vector control can be executed simultaneously with the motor control.

Figure 9A:
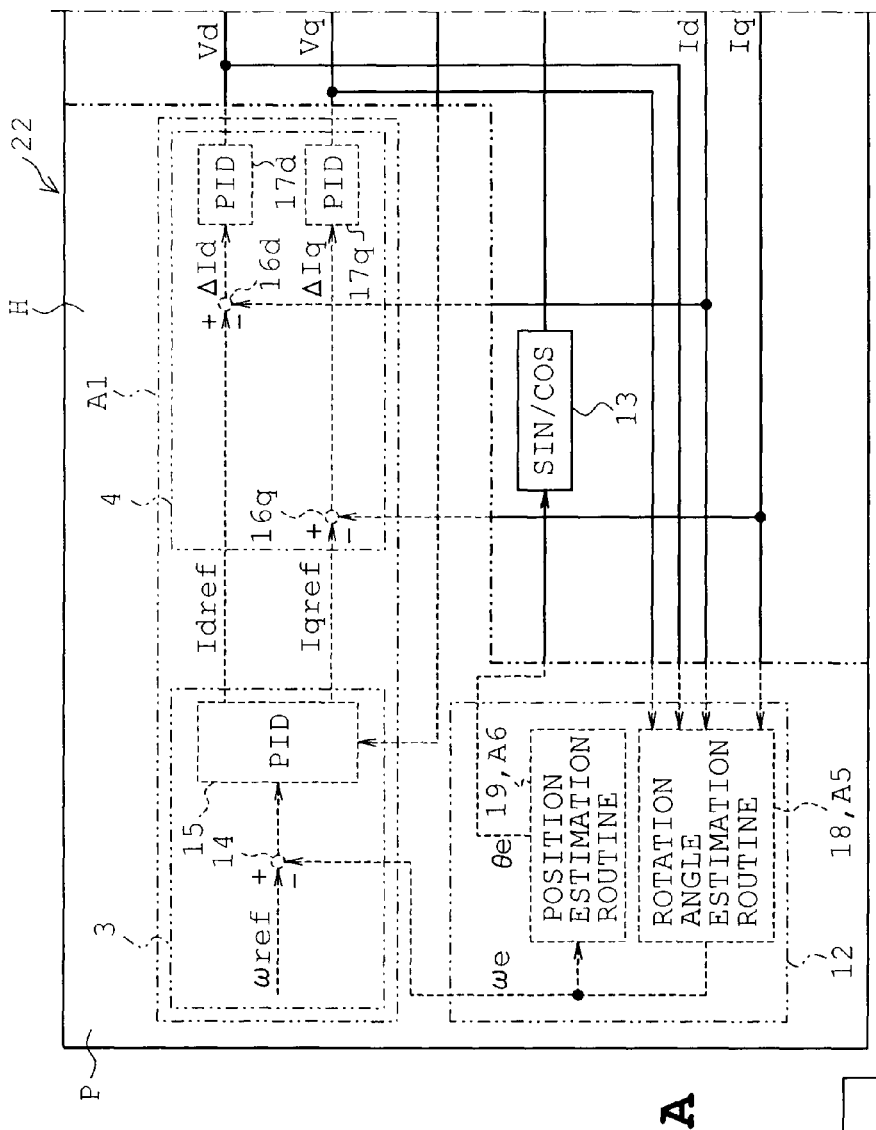
FIGS. 9A and 9B are block diagrams similar to FIGS. 1A and 1B, showing a motor control system in accordance with a second embodiment.
Figure 9B:
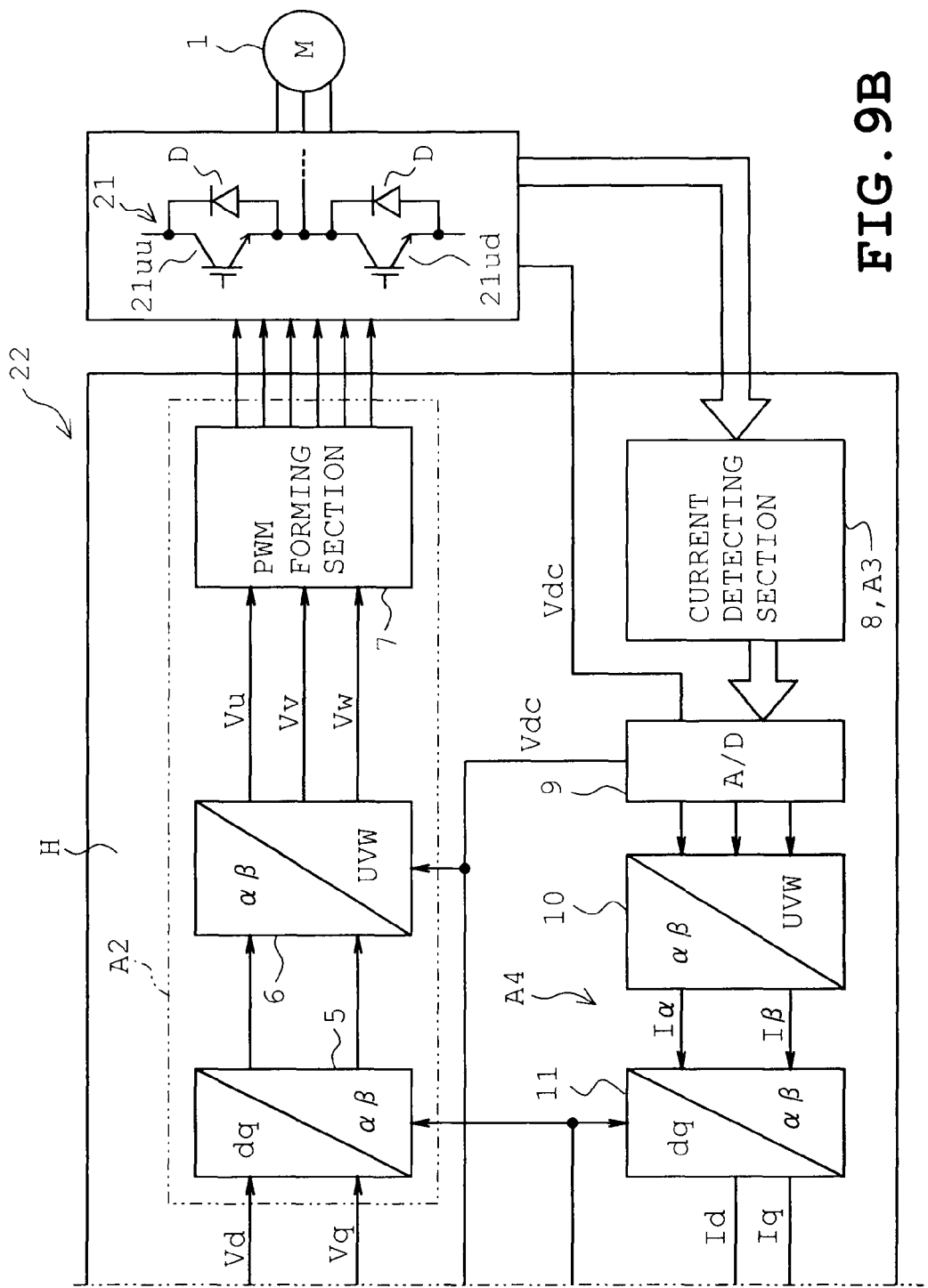

FIGS. 9A and 9B illustrate a second embodiment, which differs from the foregoing embodiment in that the current control section is configured by software executable on the processor P, instead of being provided as the hardware H. The motor control device is designated by a reference numeral "22" since the arrangement thereof is changed in the second embodiment.

Only the speed control section 3 and the position estimating section 12 are realized by the control software executable on the processor P in the previous embodiment. In the second embodiment, however, the current control section 4 is also configured as software. The reason for this configuration is that the control sometimes has a difficulty in following high-speed rotation of the motor 1 when the current control section 4 is used as the hardware H. However, when the processor P is configured so as to directly set the d-axis and q-axis voltage commands $V_d$ and $V_q$ by the control software, the control can follow the high-speed rotation of the motor 1.

As another reason, there is a case where a manner of configuring the current control section 4 includes know-how matched to purposes intended by the user. Thus, the current control section 4 is configured as software in order to meet the requirement of the user who does not need the current control section 4 realized by the hardware H. More specifically, the speed control section 3 and the current control section 4 are configured into function sections showing user's know-how matched to purposes intended by the user. The degree of freedom in the design of the motor control device by the user can be improved in the second embodiment since the current control section 4 is configured by the software.

FIGS. 10A to 14 illustrate a third embodiment, which differs from the first embodiment in that the motor control device is switchable between a 3 shunt detection system and a 1 shunt detection system on software. Identical or similar parts in the third embodiment are labeled by the same reference symbols as those in the first embodiment and the description of these identical or similar parts will be eliminated. Only the difference will be described in the following.

Figure 10A:
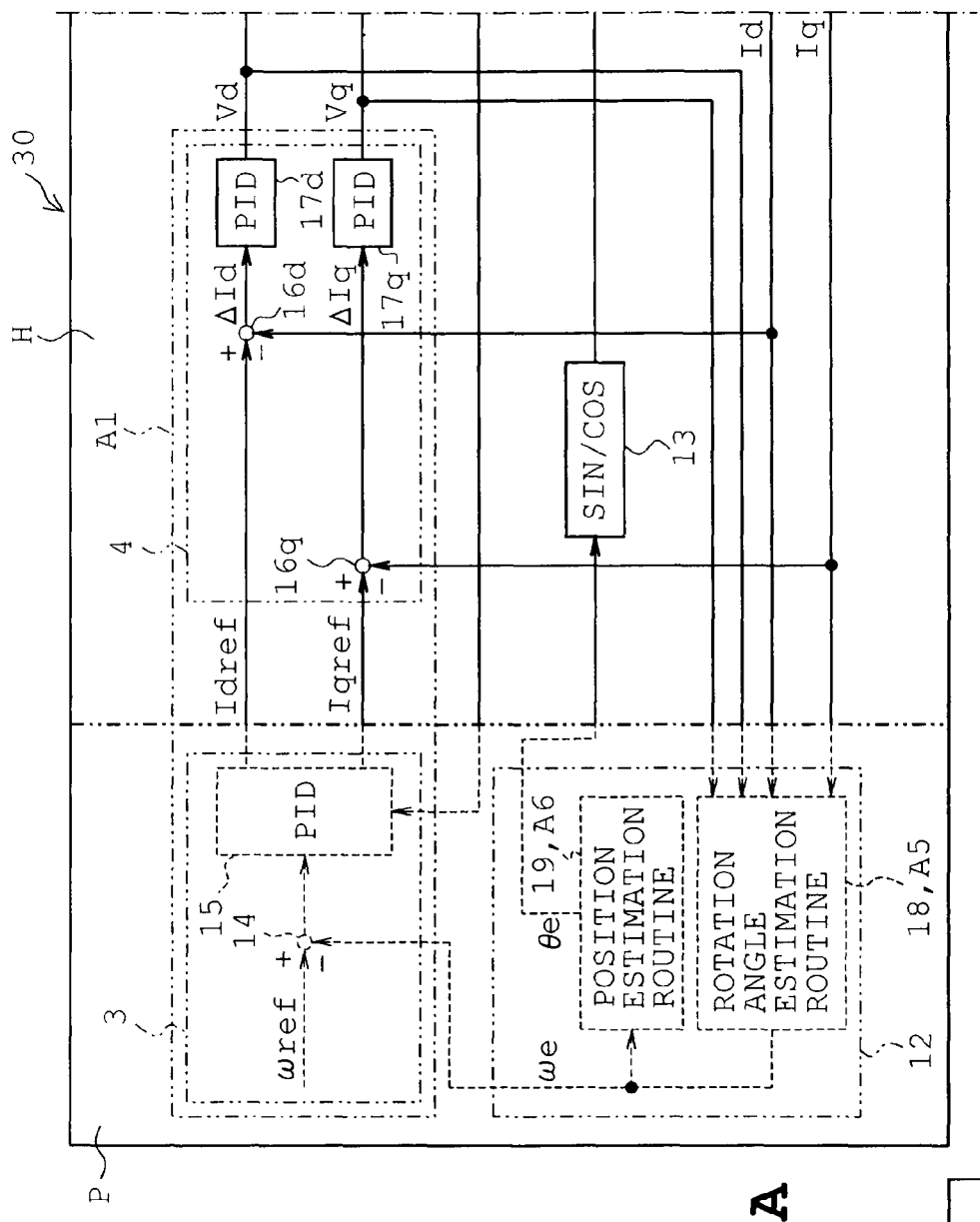
FIGS. 10A and 10B are block diagrams similar to FIGS. 1A and 1B, showing a motor control system in accordance with a third embodiment.
Figure 10B:
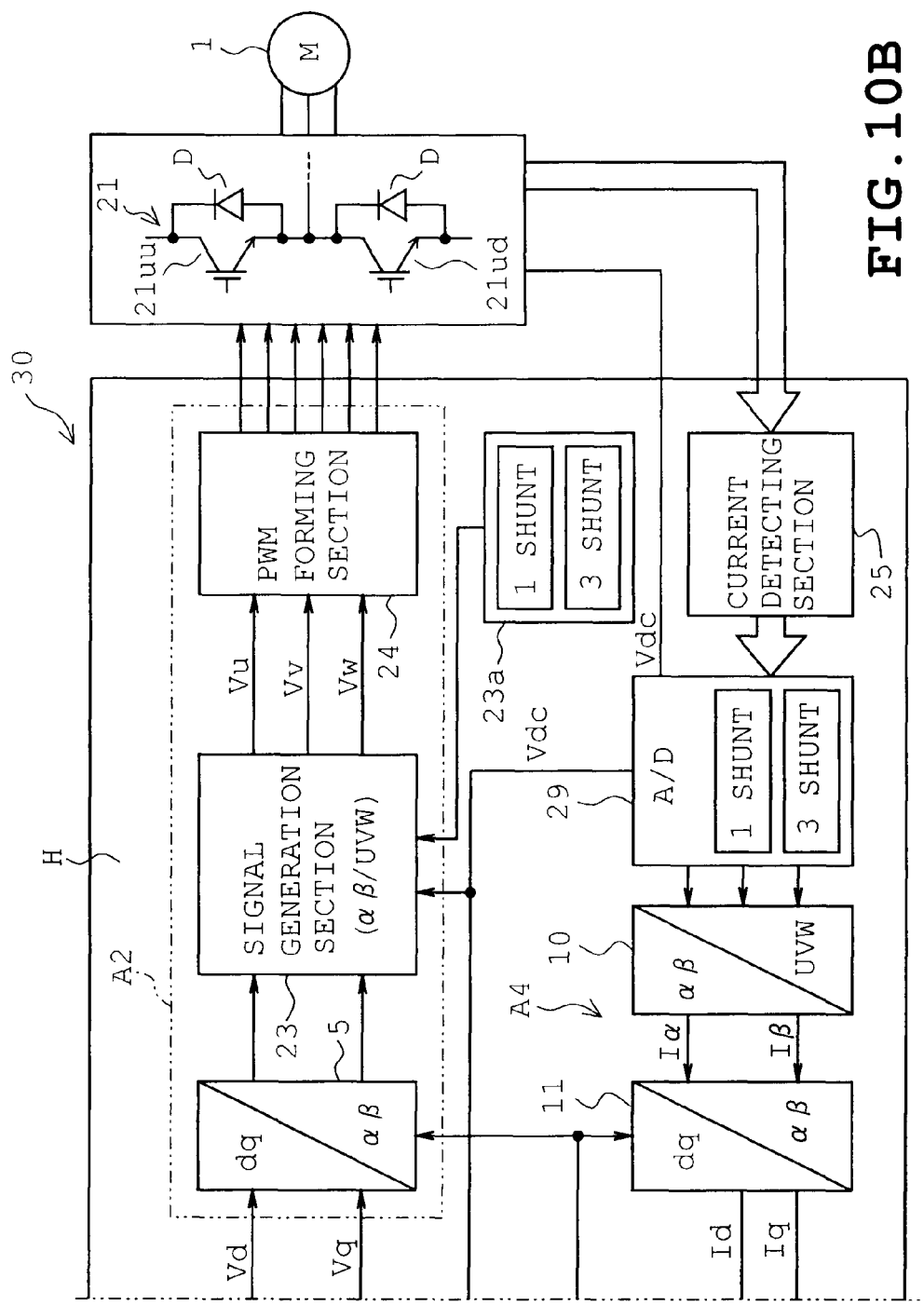

A motor control device 30 is provided instead of the motor control device 2 as shown in FIGS. 10A and 10B. The motor control device 30 is provided with a current detection section 25 having both 1 and 3 shunt detection systems as the current detection system, instead of the 3 shunt current detection section 8, so that the current detection section 25 can detect current by both shunt detection systems. The motor control device 30 is further provided with an A/D converter 29 which executes an A/C conversion for the result of detection by the current detection section 25.

The motor control device 30 is further provided with a signal generating section 23 to which a drive system corresponding to both detection systems is applied, instead of the αβ/dq coordinate converter 6. The signal generating section 13 includes a switch 23a which switches the drive system between the 1 shunt type and the 3 shunt type. The switch 23a delivers a command signal to the signal generating section 23, so that the signal generating section 23 switches the drive system between the 1 shunt type and the 3 shunt type, thereby delivering three-phase voltage commands $V_u$, $V_v$ and $V_w$ to the PWM signal forming section 24. The PWM signal forming section 24 has the same function as the PWM signal forming section 7. The function of the 3 shunt type will be eliminated since the function has been described in the first embodiment.

Figure 11:
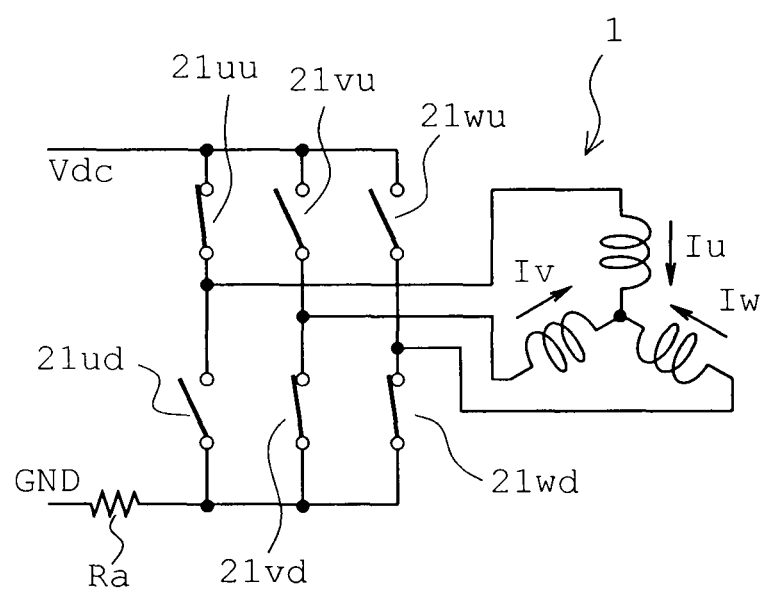
FIG. 11 is a diagram showing an electrical arrangement of the current detection section of 1 shunt detection system.

FIG. 11 shows a schematic electrical arrangement of an electric detection manner by the 1 shunt type detection system. As shown in FIG. 11, a shunt resistance Ra is connected in series to a GND power supply node. The signal generation section 23 has a 1 shunt type drive section which selects a fundamental vector composing a voltage vector command $V_r$ and a zero vector by a spatial vector method. The signal generation section 23 then executes PWM correction process, thereby delivering a signal to the PWM signal forming section 24. The PWM signal forming section 24 enters a signal from the signal generating section 23 to generate a drive signal to be supplied to each gate of the inverter circuit 20.

Numeral "1" designates a drive state in which upper arm side IGBTs 21*uu*, 21*vu*, 21*wu* are turned on for every phase. A drive state in which lower arm side IGBTs 21*ud*, 21*vd*, 21*wd* are turned on for every phase is referred to as "0." The IGBTs are arranged in the sequence of phases U, V and W, whereby six base vectors and two zero vectors all of which the inverter circuit 20 delivers can be shown.

Figure 13:
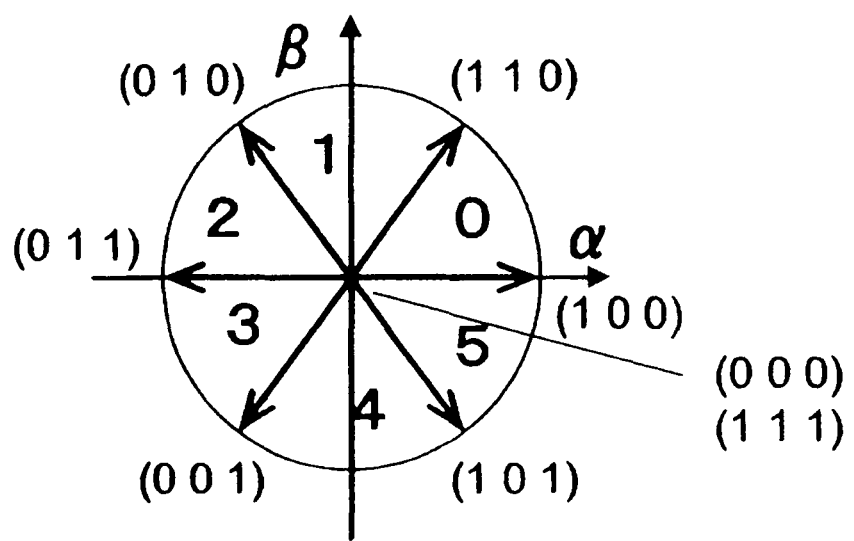
FIG. 13 shows voltage vector in an αβ coordinate system.

FIG. 12 shows eight energization patterns of the six fundamental voltage vectors (100), (011), (010), (101), (001) and (110) and two zero vectors (111), (000). As shown in FIG. 13, each fundamental vector and an adjacent one have the phase difference of 60° on the αβ coordinate. In this case, when the directions of arrows of the currents $I_u$, $I_v$ and $I_w$ are defined as positive directions, dc currents flowing into a detection resistance Ra in the energization of eight energization patterns are shown in FIG. 12. As understood from FIG. 12, eight drive states determined by combination of ON and OFF of the IGBT 21 include the drive states corresponding to six fundamental vectors. In these drive states corresponding to the six fundamental vectors, the current equal to any one of $+I_u$, $-I_u$, $+I_v$, $-I_v$, $+I_w$ and $-I_w$ flows into the resistance Ra. Accordingly, the processor P can detect phase currents as shown in FIG. 12 based on the current detected by the current detection section 25 and a current drive state of the inverter circuit 20.

The PWM signal forming section 24 selects two adjacent fundamental voltage vectors with the phase difference of 60° and one zero vector by a spatial vector method for every PWM period and combines the selected vectors so that the number of switching times is reduced, thereby delivering signals to the inverter circuit 20. In order that all phase currents $I_u$, $I_v$ and $I_w$ may be detected in one PWM period, this detecting manner necessitates the presence of a drive period corresponding to two fundamental vectors with respective phases that are not the same or not opposite to each other. As a result, currents of two different phases corresponding to each fundamental vector can be detected. Current of the remaining phase can be obtained by operation with the use of relational expression, Iu+Iv+Iw=0. This detecting manner is desirable since the circuit configuration of the hardware becomes simpler as compared with the 3 shunt detection system described in the previous embodiments.

Figure 14:
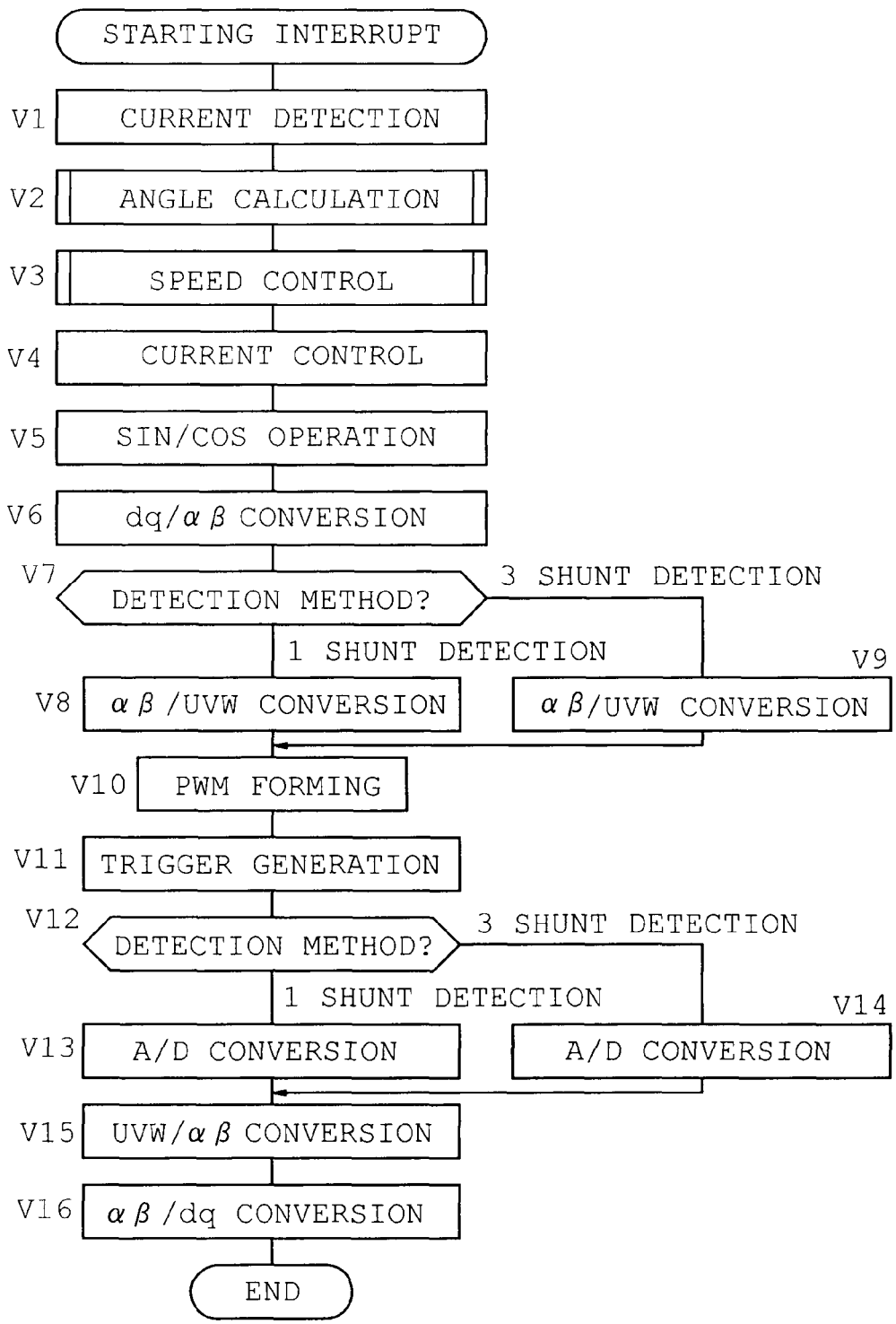
FIG. 14 is a flowchart showing the process for changing between 3 shunt detection system and 1 shunt detection system.

FIG. 14 shows a sequence of the switching between a 1 shunt detection manner and a 3 shunt detection manner and more specifically, processing after triggered interrupt of A/D conversion. As shown, upon occurrence of the triggered interrupt of A/D conversion, the current detecting section 25 executes a current detecting process, the position detecting section 12 executes an angle calculation, and the speed detecting section 3 executes a speed control (V1 to V3). Thereafter, the current control section 4 executes a current control process, the SIN/COS operation section 13 executes an operation, and the dq/αβ coordinate converter 5 executes a dq/αβ conversion process (V4 to V6). Further thereafter, the switching section 23*a* in the hardware H refers to the drive switching register to determine whether the driving method is a 1 shunt drive current detection method or a 3 shunt drive current detection method (V7). The signal generating section 23 executes an αβ/UVW conversion process (V8 and V9), delivering the result of conversion to the PWM forming section 24.

Subsequently, the PWM forming section 24 generates a PWM signal (V10), delivering the PWM signal to the inverter circuit 20. Next, the trigger generating section generates and delivers a trigger (V11). Upon occurrence of interrupt, the A/D conversion section 29 (the current detecting section 25) refers to the drive switching register to determine whether the driving method is a 1 shunt drive current detection method or a 3 shunt drive current detection method (V12), executing an A/D conversion process matched to the determined driving method (V13 and V14). Subsequently, the UVW/αβ coordinate conversion section 10 executes a UVW/αβ conversion process (V15), and the αβ/dq coordinate conversion section 11 executes an αβ/dq conversion process (V16), thus the above-described control manner being repeated.

The signal generating section 23 and the A/D conversion section 29 (the current detecting section 25) refer to the drive switching register in the hardware H, switching the 1 shunt drive current detection method and the 3 shunt drive current detection method to execute driving and current detection respectively.

According to the third embodiment, write onto the drive switching register is carried out from the processor P, and the signal generating section 23 and the A/D conversion section 29 switch the driving manner to the drive current detection methods according to the drive switching register, whereupon driving and current detection can be executed. Consequently, the driving manner and the current detection method can easily be switched.

Figure 15:
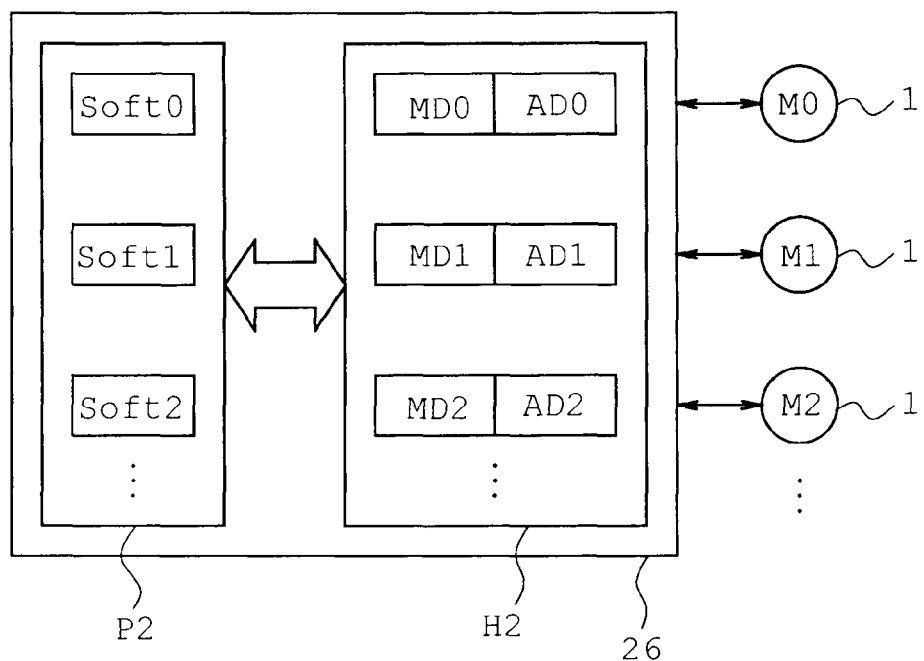
FIG. 15 is a block diagram showing a fourth embodiment.
Figure 16:
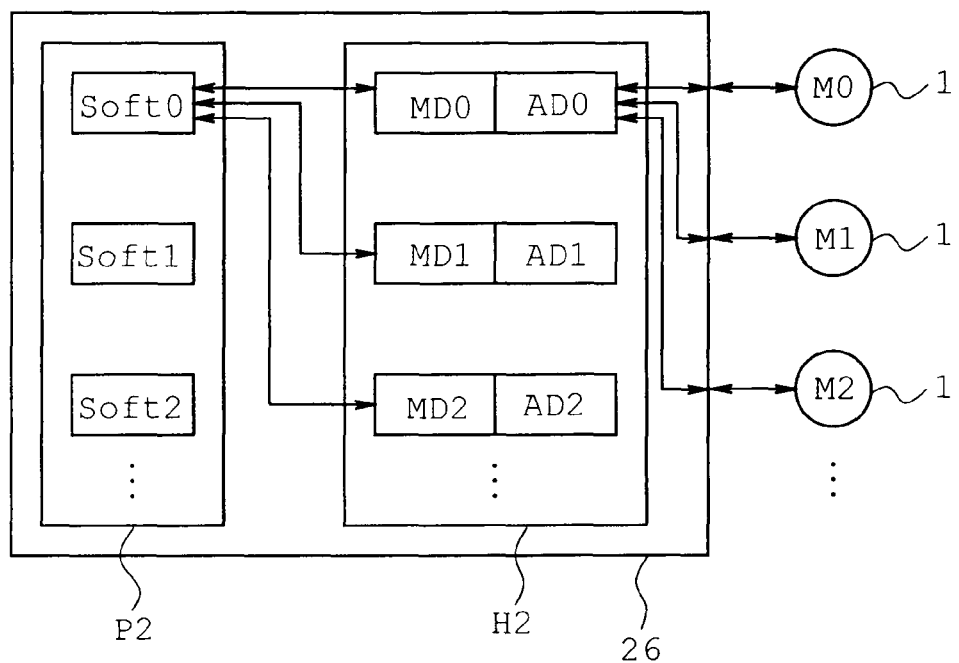
FIG. 16 is a diagram explaining the operation of the motor control device.

FIGS. 15 and 16 illustrate a fourth embodiment. The fourth embodiment differs from the previous embodiments in that the motor control device includes a plurality of the same control channels so that a plurality of channels are provided, whereupon a plurality of motors can be controlled through a plurality of channels. Identical or similar parts in the fourth embodiment are labeled by the same reference symbols as those in the first embodiment and the description of these identical or similar parts will be eliminated. Only the difference will be described in the following.

FIG. 15 shows a plurality of motors connected to outputs of the motor control device. As shown, the motor control device 26 employed instead of the motor control device 2 has a multichannel function and includes a plurality of output circuits (drive circuits MD0, MD1 and MD2), and a plurality of input circuits (A/D conversion sections AD0, AD1 and AD2). The drive circuits are provided with respective input/output interfaces and accordingly have a plurality of the hardware configurations shown in the previous embodiment (the configuration of hardware H as shown in FIG. 1, for example). Thus, a plurality of the hardwares H having the same configuration is provided.

A memory is provided at the processor P2 side and stores a plurality of control softwares Soft0, Soft1, Soft2 and so on. The processor P2 is adapted to execute any one of the control softwares Soft0, Soft1, Soft2 and so on. When executing one control software Soft0, the processor P2 selectively drives the plural drive circuits MD0, MD1, MD2 and the plural motors 1 can be driven by the single drive circuit MD0, as shown in FIG. 16.

More specifically, the trigger interrupt process as described in the previous embodiment results in a waiting time from end of output process to start of input process. Input and output processes of another channel can be executed using the unoccupied time.

According to the fourth embodiment, the hardware H2 is provided with a plurality of the same drive circuits MD0, MD1, MD2 and so on and accordingly, a plurality of control channels is provided. Accordingly, since the plural motors 1 are controlled, the motor control time can be reduced and the general versatility can also be improved.

More specifically, some electronic equipment is provided with two or more microcomputers. For example, a washing machine with a drying function includes a motor for rotating a wash tub and a compressor motor. An air conditioner includes a compressor motor and a fan motor for an external unit. These electric apparatus need to have conventionally provided with two or more control devices. However, when the configuration of the embodiment is applied to these apparatus, the single motor control device 26 can control the plural motors 1.

<Examples of Parameter of Control Operation Command and Parameter for Reference>

The following describes examples of a parameter of control operation command and parameters for reference. Note that some of these parameter settings are applicable in the foregoing embodiments and other parameter settings can be set and referred to by connecting an external component (an encoder or the like) the apparatus as shown in other embodiments which will be described later.

A variable parameter the processor P uses on the control software includes a main cycle time counter, reset standby time counter, reset parameter, AD input value, rotational speed, rotational position command value, motor control command value, previous motor control command value, start-up d-axis current command value, start-up q-axis current command value, acceleration/deceleration limit in forced commutation, acceleration limit in steady state, deceleration limit in steady state, length of positioning time, forced steady state switching waiting time, initial motor position, motor stage, motor stage record, motor stage transition, counter in stage, interrupt processing motor stage, command (motor on/off flag, PI operation flag of angular velocity, encoder input flag), motor angular speed command value, d-axis current command value Idref, q-axis current command value $I_{qref}$, rotational position command value, motor status (EMG states, overcurrent state, $V_{dc}$ voltage state), d-axis current reference, q-axis current reference, d-axis current command (integral value), motor angular speed, motor angular speed integral value, motor angular speed deviation, motor electrical angle, encoder count, encoder count save, encoder count deviation, and the like, all of which are parameters relating to the operation of the motor 1.

Constant parameters the processor P uses on the operation software include a master clock, start-up q-axis current command, start-up d-axis current command, motor winding resistance, motor q-axis inductance, motor d-axis inductance, motor electro-motive force, motor pole number, maximum input current, current error, d-axis current limit value, q-axis current limit value, maximum start-up current, PWM period, PWM carrier frequency, DC maximum voltage, DC voltage limit, maximum frequency, limit frequency, minimum frequency, driver control period, frequency control proportional gain, frequency control proportional integral gain, resolver axis double angle, encoder pulse number, pulse count, acceleration/deceleration limit during forced commutation, acceleration limit during steady state, deceleration limit during steady state, length of DC excitation time, waiting time length after switching of forced steady state, processing interval, main functional loop process, positive/reverse rotation, waiting time after reset, and the like, all of which are parameters relating to the operation of the motor 1.

Variable parameters which are stored on a register by the hardware H and are externally readable/writable include an operation control mode, operation designation, operation process selection, rotational speed, d-axis current command (current input register), q-axis current command (current input register), d-axis current, q-axis current, d-axis voltage command (voltage input register), q-axis voltage command (voltage input register), motor phase, d-axis reference value, q-axis reference value, CPU start-up trigger selection, result of A/D conversion of phase U current, result of A/D conversion of phase V current, result of A/D conversion of phase W, DC power supply voltage $D_{dc}$ and the like.

Furthermore, constant parameters which are stored on a register by the hardware H and are externally readable/writable include a motor control channel mode selecting register, port output mode register, trigger output mode setting register, emergency (EMG) cancel register, emergency control register, dead time register, dead time register, valid/invalid state of hardware, MD output control (MDOUT), flow control, PWM period rate, PWM period, PWM period, PWM period register, processing repeat count, start-up trigger mode, error interrupt allowance/prohibition, forced termination, d-axis current control PID integral term factor, d-axis current control PID proportional term factor, d-axis current control PID differential term factor, q-axis current control PID differential term factor, q-axis current control PID integral term factor, q-axis current control PID proportional term factor, q-axis current control PID differential term factor, switching speed at the time of allowance of shift PWM by two-phase modulation, minimum pulse width, monitor control, A/D conversion time, MD control: EMG return, soft program register, A/D mode setting register, MD trigger program number selecting register, MD trigger interrupt selecting register, and the like.

The above-mentioned variable parameters and constant parameters can be used by the user in the foregoing embodiment and other embodiments which will be described later if necessary. Thus, the device is configured so as to immediately cope with modification of hardware, change in specification and the like, and it is desirable that the variable and constant parameters be set and/or referred to on the control software.

The foregoing description should not be restrictive and may be modified or expanded as follows.

At least a part of the plural function sections A1 to A6 (sections 4 to 15, 16d, 16q, 17d, 17q) may be composed of the hardware H.

Although the position estimating section 12 is built into the device as the software in the foregoing embodiment, the user of the motor control device 2 may apply various external angular sensors, such as a resolver or a rotary encoder, to the position detecting section, instead of the position estimating section 12. A Hall IC may be used as the position detecting section. In this case, the user need not configure the position estimating section 12. Furthermore, since these are selected in accordance with the usage of motor application, the freedom in the design of the device can be improved. One of the reasons for this is that the position estimating section 12 is not configured as the hardware in the motor control device 2.

More specifically, there is a case where the user configures an external angular sensor on the motor control device 2 or a case where the position estimating know-how differs from one user to another. Accordingly, the speed information generating section A5 and the position information generating section A6 may be realized by control software which can be executed by the processor P without being configured by the hardware in the motor control device 2.

An interrupt signal may be generated in the processor P when a function section configured by the hardware H is operated in accordance with a predetermined sequence. When accepting the interrupt signal, the processor P may start predetermined control software and execute processing. In this configuration, the hardware H and the software executed by the hardware can simultaneously be operated.

For example, when a position detecting section comprises an angular sensor on the hardware, instead of the position estimating section 12, the current detecting section 8 configured by the hardware H generates a PWM interrupt signal, and the A/D converter section 9 generates an A/D conversion terminating interrupt signal. The speed operation section 3 is executed by software when the processor P has accepted the interrupt signal. This can realize the simultaneous processing of the operational processing by the UVW/αβ coordinate converter 10 and the dq/αβ coordinate converter 11 on the hardware H and the operational processing by the speed operation section 3 on the software, whereupon the processing speed of the vector control can be improved.

The voltage command generating section A1 may also be configured so as to be realized by the control software without being configured by the hardware since user's know-how is sometimes applied to an output manner of the d-axis voltage command $V_d$ and the q-axis voltage command $V_q$.

The function sections A1 to A6 may be configured so as to be switchable with the function sections A1 to A6 respectively when any one of the functions A1 to A6 is realizable by execution of the control software by the processor P and the function sections A1 to A6 are configured by the hardware H.

More specifically, an example of the above-described configuration is the case where the current control section 4 is configured by the hardware H. The current control section 4 may be configured not only by the hardware H but also by the control software as described in the foregoing embodiment. The function is configured in the motor control device 2 in either case so as to be switched by a switch or the like or by selecting a subroutine. For example, a harmonic wave suppressing current control may be configured. As a result, the freedom in the design by the user can be improved.

Furthermore, the set values of the d-axis and q-axis voltage commands $V_d$ and $V_q$ are written onto the voltage input register by the processor P on the control software in the foregoing embodiment. However, the processor P may disable the operation of the current control section 4 so that the current control section 4 halts output of the d-axis and q-axis voltage commands $V_d$ and $V_q$, and the configuration routine (the control software) of the PID control section 15 may be applied so that the d-axis and q-axis voltage commands $V_d$ and $V_q$ are written onto the voltage input register.

The dq/αβ coordinate converter 5, the αβ/UVW coordinate converter 6, the PWM forming section 7 are all configured as the voltage operation processing section A2 on the hardware H in the aforesaid first and second embodiments. However, a part of the dq/αβ coordinate converter 5, the αβ/UVW coordinate converter 6, the PWM forming section 7 may be configured on the hardware H, instead. In the same way, a part of the sections 8 to 11 may be configured on the hardware in the current detecting section A3 and the input current operation section A4, instead.

The dq/αβ coordinate converter 5, the signal generating section 23, the PWM forming section 24 may be configured as the voltage operation processing section A2 on the hardware H in the third embodiment. However, a part of the dq/αβ coordinate converter 5, the signal generating section 23, the PWM forming section 24 may be configured on the hardware H. In the same manner, a part of the sections 25 and 9 to 11 in the current detecting section A3 and the input current operation section A4 may be configured on the hardware H, instead.

While certain embodiments have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A motor control device which controls an inverter thereby to control an electric motor, comprising:
    a plurality of function sections including:
        a voltage command generating section which generates a d-axis voltage command and a q-axis voltage command;
        a voltage operation processing section which delivers an energization signal to the inverter including a switching element and driving the motor, based on the d-axis voltage command and the q-axis voltage command both generated by the voltage command generating section;
        a current detecting section which detects current flowing in a winding of the motor when the voltage operation processing section has delivered the energization signal to the inverter;
        an input current operation section which obtains the d-axis current that is an excitation component current and the q-axis current that is a torque component current, based on the current detected by the current detecting section;
        a speed information generating section which estimates or detects a rotational speed of the motor based on at least one of a motor constant, the d-axis voltage command generated by the voltage command generating section, the q-axis voltage command generated by the voltage command generating section, the d-axis current obtained by the input current operation section, the q-axis current obtained by the input current operation section, thereby delivering a rotational speed signal; and
        a positional information generating section which delivers positional information about a rotor of the motor, based on the rotational speed signal delivered by the speed information generating section;
    a processor which executes control software provided by a user or a manufacturer, wherein:
    at least a part of the function sections are configured by hardware;
    the function section configured by the hardware is provided with at least one parameter retaining section including an input register, an output register, an inner variable register, an inner constant register;
    the parameter retaining section is configured so as to be readable/writable on the processor;
    the function section configured by the hardware is adapted to be operated in a predetermined sequence; and
    each function section is realized by executing the control software by the processor, and the function realized by executing the control software by the processor is configured so as to be switchable to the function section configured in the hardware.

2. The device according to claim 1, wherein the function sections are configured so as to be switched between an operationally effective state and an operationally ineffective state on the processor.

3. A motor control device which controls an inverter thereby to control an electric motor, comprising:
a plurality of function sections including:
   a voltage command generating section which generates a d-axis voltage command and a q-axis voltage command;
   a voltage operation processing section which delivers an energization signal to the inverter including a switching element and driving the motor, based on the d-axis voltage command and the q-axis voltage command both generated by the voltage command generating section;
   a current detecting section which detects current flowing in a winding of the motor when the voltage operation processing section has delivered the energization signal to the inverter;
   an input current operation section which obtains the d-axis current that is an excitation component current and the q-axis current that is a torque component current, based on the current detected by the current detecting section;
   a speed information generating section which estimates or detects a rotational speed of the motor based on at least one of a motor constant, the d-axis voltage command generated by the voltage command generating section, the q-axis voltage command generated by the voltage command generating section, the d-axis current obtained by the input current operation section, the q-axis current obtained by the input current operation section, thereby delivering a rotational speed signal; and
   a positional information generating section which delivers positional information about a rotor of the motor, based on the rotational speed signal delivered by the speed information generating section;
a processor which executes control software provided by a user or a manufacturer, wherein:
at least a part of the function sections are configured by hardware;
the function section configured by the hardware is provided with at least one parameter retaining section including an input register, an output register, an inner variable register, an inner constant register;
the parameter retaining section is configured so as to be readable/writable on the processor;
the function section configured by the hardware is adapted to be operated in a predetermined sequence; and
the function sections are configured so as to be switchable between an operationally effective state and an operationally ineffective state on the processor.

4. The device according to claim 1, wherein:
at least the voltage operation processing section is configured by hardware;
the voltage operation processing section is provided with a drive switching register which holds a flag switching and setting as the parameter retaining section between a 1 shunt drive current detection system and a 3 shunt drive current detection system so that data is directly written onto the drive switching register from the processor; and
a current detection timing in each of the 1 and 3 shunt drives is changed according to a set value of the drive switching register.

5. The device according to claim 1, wherein:
the voltage command generating section includes a speed control section which generates the d-axis current command and the q-axis current command so that a rotational speed of the motor corresponds with an externally supplied rotational speed command, and a current control section which generates a d-axis voltage command and a q-axis voltage command so that the d-axis current and the q-axis current both obtained by the input current operation section correspond with the d-axis current command and the q-axis current command both generated by the speed control section; and
the current control section is configured by hardware and includes, as the parameter retaining section, a current value input register holding the d-axis current value and the q-axis current value so that the command value is directly written onto the current value input register from the processor.

6. The device according to claim 1, further comprising a voltage value input register serving as the parameter retaining section and holding the d-axis voltage command value and a q-axis voltage command value as the parameter retaining section, wherein:
the voltage operation processing section is configured by the hardware; and
the voltage value input register is configured so as to be directly writable on the processor.

7. The device according to claim 1, wherein the processor is configured so as to write a command value according to the control onto the parameter retaining section of the hardware of the function section, whereby a plurality of control operations may be switchable.

8. The device according to claim 1, wherein:
the voltage operation processing section is configured by the hardware including a dq/αβ coordinate converter which converts the d-axis voltage command and the q-axis voltage command to values represented by an α-β coordinate system, an αβ/UVW coordinate converter which converts the value represented by the α-β coordinate system by the dq/αβ coordinate converter to phase command voltages of a stator of the motor, and a PWM signal forming section which fetches the phase command voltages converted by the αβ/UVW coordinate converter to form pulse-width modulated gate drive signals for supplying voltages corresponding with d-axis voltage command and q-axis voltage command, delivering the gate drive signals as energization signals to the inverter;
the current detecting section is configured by the hardware including an A/D conversion section which executes A/D conversion for a value of current flowing in the motor;
the processor sets, in the hardware, a control operation command which renders a control operation of the current detecting section effective when in a halting state and disables control operations of the dq/αβ coordinate converter and the αβ/UVW coordinate converter; and
the hardware is set so that a feedback control operation and a zero current detection operation are disabled and phase interpolation is disallowed, whereby a PWM control operation is stopped.

9. The device according to claim 1, wherein:
the motor includes a rotor;
the voltage operation processing section is configured by the hardware including a dq/αβ coordinate converter which converts the d-axis voltage command and the q-axis voltage command to values represented by an α-β coordinate system, an αβ/UVW coordinate converter which converts the value represented by the α-β coordinate system by the dq/αβ coordinate converter to phase command voltages of a stator of the motor, and a PWM signal forming section which fetches the phase command voltages converted by the αβ/UVW coordinate converter to form pulse-width modulated gate drive signals for supplying voltages corresponding with d-axis voltage command and q-axis voltage command, delivering the gate drive signals as energization signals to the inverter;

the current detecting section is configured by the hardware including an A/D conversion section which executes A/D conversion for a value of current flowing in the motor;

the processor sets, in the hardware, a control operation command which renders a control operation of the current detecting section effective when detecting a zero current and disables control operations of the dq/αβ coordinate converter and the αβ/UVW coordinate converter; and the hardware is set so that a feedback control operation is disabled, phase interpolation is allowed, and a zero current detecting operation is effected, thereby detecting a zero current.

10. The device according to claim 1, wherein:
the motor includes a rotor;
the voltage operation processing section, the current detecting section and the input current operation section are each configured by hardware;
the processor sets, on the hardware, a control operation command which enables control operations of the voltage operation processing section, the current detecting section and the input current operation section, with the rotor being positioned, thereby enabling sequential processing by the voltage operation processing section, the current detecting section and the input current operation section; and
the hardware is set so that a feedback control operation is enabled, a zero current detecting operation is disabled, and phase interpolation is disallowed, thereby fixing the position of the rotor of the motor in a vicinity of zero.

11. The device according to claim 1, wherein:
the motor includes a rotor;
the voltage operation processing section, the current detecting section and the input current operation section are each configured by hardware;
the processor sets, on the hardware, a control operation command which enables control operations of the voltage operation processing section, the current detecting section and the input current operation section, in a forced commutation, thereby enabling sequential processing by the voltage operation processing section, the current detecting section and the input current operation section; and
the hardware is set so that a feedback control operation is enabled, a zero current detecting operation is disabled, and phase interpolation is allowed, whereby a rotating field is imparted to the rotating field so that the rotor is rotated, following the rotating field.

12. The device according to claim 1, wherein:
the motor includes a rotor;
the voltage operation processing section, the current detecting section and the input current operation section are each configured by hardware;
the processor sets, on the hardware, a control operation command which enables control operations of the voltage operation processing section, the current detecting section and the input current operation section, in a forced steady switching stage, thereby enabling sequential processing by the voltage operation processing section, the current detecting section and the input current operation section; and
the hardware is set so that a feedback control operation is enabled, a zero current detecting operation is disabled, and phase interpolation is disallowed, whereby the motor is driven according to a position of the rotor such that the motor is transferred to a steady state so that a forced rotating field is prevented from being imparted to the motor.

13. The device according to claim 1, wherein:
the motor includes a rotor;
the voltage operation processing section, the current detecting section and the input current operation section are each configured by hardware;
the processor sets, on the hardware, a control operation command which enables control operations of the voltage operation processing section, the current detecting section and the input current operation section, in a steady stage, thereby enabling sequential processing by the voltage operation processing section, the current detecting section and the input current operation section; and
the hardware is set so that a feedback control operation is enabled, a zero current detecting operation is disabled, and phase interpolation is disallowed, whereby the motor is driven according to a position of the rotor thereby to be driven steadily.

14. The device according to claim 1, further comprising a speed control section realized by executing software by the processor and a current control section configured by hardware, wherein the processor disables operations of the speed control section and the current control section and writes onto a voltage value input register serving as the parameter retaining section so that set parameter values of the d-axis voltage command and the q-axis voltage command are set to 0, whereby a short-circuit brake control is executed.

15. The device according to claim 1, wherein the voltage command generating section includes a speed control section which is realized by executing software by the processor and generates the d-axis current command and the q-axis current command and a current control section which is configured by the hardware and generates a d-axis voltage command and a q-axis voltage command based on the d-axis current command and the q-axis current command respectively, and the processor disables operations of the speed control section and the current control section and adjusts parameter set values of the d-axis voltage command and the q-axis voltage command to write and set the adjusted parameter set values onto a voltage value input register serving as the parameter retaining section, thereby effecting a regenerative brake control.

16. The device according to claim 1, wherein the voltage command generating section includes a speed control section which generates a d-axis current command and a q-axis current command and a current control section which is configured by the hardware and generates a d-axis voltage command and a q-axis voltage command based on the d-axis current command and the q-axis current command respectively, and the processor disables operations of the speed control section and directly sets parameter set values of the d-axis current command and the q-axis current command to zero and writes the parameter set values set to zero onto a current value input register serving as the parameter retaining section, whereby the motor is free-run.

17. The device according to claim 1, wherein at least the voltage operation processing section, the current detecting section and the input current operating section are configured by hardware, and the speed information generating section and the positional information generating section, the voltage command generating section are formed so as be configurable by a control software executed by the processor.

18. The device according to claim 1, wherein the hardware includes a plurality of identical circuits so as to provide a plurality of channels, whereby a plurality of the motors is controlled.

19. The device according to claim 1, wherein the function section configured by the hardware generates an interrupt signal when operated in a preset sequence, the interrupt signal being supplied to the processor, and the processor starts a predetermined control software when accepting the interrupt signal, thereby executing processing.

20. Electrical equipment comprising an electric motor, an inverter and the motor control device disclosed in claim 1.

21. The device according to claim 3, wherein said switchable function sections include a function section configured by hardware.

22. The device according to claim 3, wherein said switchable function sections include a function section realized by executing software by the processor.

* * * * *